United States Patent
Shilkrut et al.

[11] Patent Number: 6,000,310
[45] Date of Patent: Dec. 14, 1999

[54] PENETRATED TOOL SYSTEM

[75] Inventors: Dov Shilkrut, Beer Sheva; Boris Sheinin, Jerusalem; Roman Gebstein; Rudolf Botner, both of Dimona, all of Israel

[73] Assignee: Clear Cut S.T. Technologies (1997) Ltd., Petach Tikva, Israel

[21] Appl. No.: 08/946,877

[22] Filed: Oct. 8, 1997

Related U.S. Application Data

[63] Continuation of application No. 08/351,364, filed as application No. PCT/GB93/01248, Jun. 11, 1993, abandoned.

[30] Foreign Application Priority Data

Jun. 11, 1992 [IL] Israel ............................... 102172
May 19, 1993 [IL] Israel ............................... 105743

[51] Int. Cl.$^6$ .................................................. B26D 5/08
[52] U.S. Cl. ................... 83/615; 83/616; 173/114; 173/162.1
[58] Field of Search ................ 83/615, 616; 30/392, 30/393, 394; 173/48, 49, 114, 162.1, 210

[56] References Cited

U.S. PATENT DOCUMENTS

| | | | |
|---|---|---|---|
| 3,537,490 | 11/1970 | Shaw et al. | 30/394 |
| 3,642,002 | 2/1972 | Otterstrom | 30/392 X |
| 3,791,461 | 2/1974 | Rosselet | 173/48 |
| 3,996,823 | 12/1976 | Guillermier | 82/152 X |
| 4,073,348 | 2/1978 | Schramm et al. | 173/48 |
| 4,276,941 | 7/1981 | Wanner et al. | 172/117 |
| 4,287,800 | 9/1981 | Persson | 83/425.3 |
| 4,346,768 | 8/1982 | Ross | 173/118 |
| 4,567,950 | 2/1986 | Fushiya et al. | 173/48 |
| 4,966,042 | 10/1990 | Brown | 74/603 X |
| 5,004,238 | 4/1991 | Okada | 273/121 B |

FOREIGN PATENT DOCUMENTS

| | | |
|---|---|---|
| 645826 | 10/1984 | Switzerland . |
| 1 487 230 | 9/1977 | United Kingdom . |

Primary Examiner—M. Rachuba
Attorney, Agent, or Firm—Helfgott & Karas, P.C.

[57] ABSTRACT

A penetrating tool system for providing a penetration action in a workpiece. The system including a penetrating element and a basic displacement element for establishing a basic displacement between the workpiece and the penetrating element during which basic displacement the penetrating action is provided. An auxiliary displacement element for imparting to the penetrating element an auxiliary reciprocating displacement superimposed on the basic displacement during the penetration action. The auxiliary reciprocating displacement has a frequency and amplitude which are substantially invariant in time, independent of reactions of the workpiece to penetration, the frequency of the auxiliary reciprocating displacement being substantially greater than a frequency of the basic displacement. The tool system further including a balancing element for generating a force in the system substantially in line with counterbalancing inertial loads and reactions in the system set up by the auxiliary reciprocating displacement, the force being directed substantially in line with the auxiliary reciprocating displacement and in the direction opposite thereto.

17 Claims, 17 Drawing Sheets

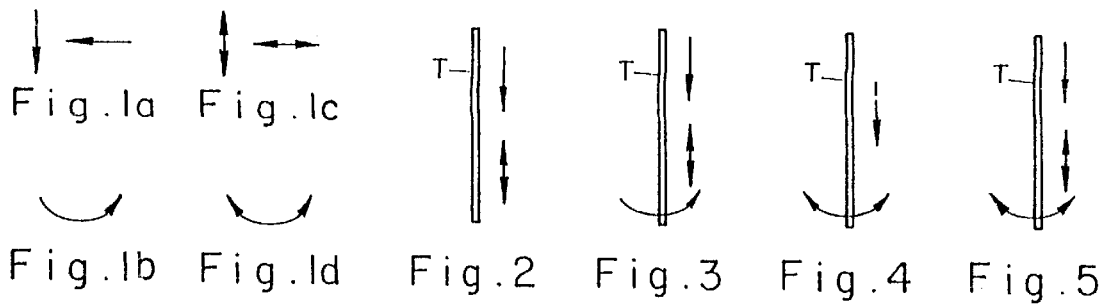
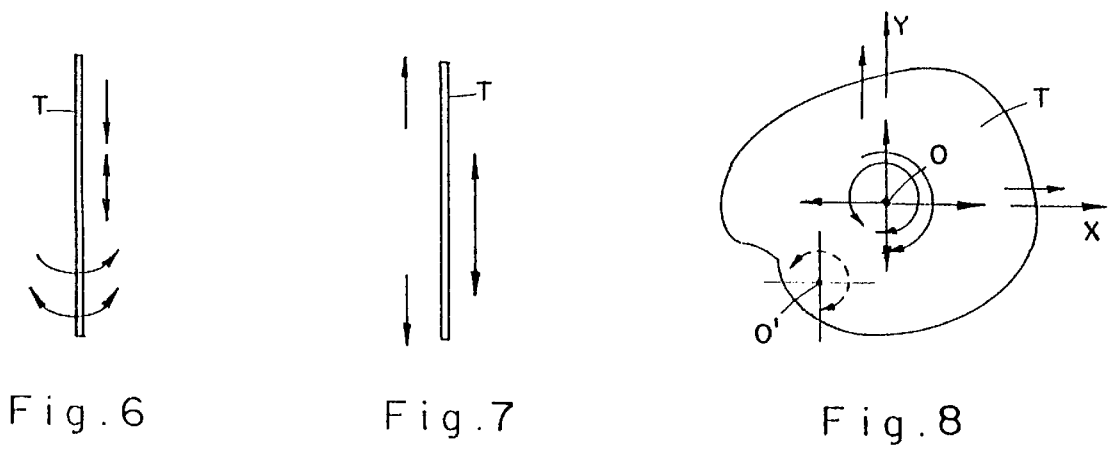
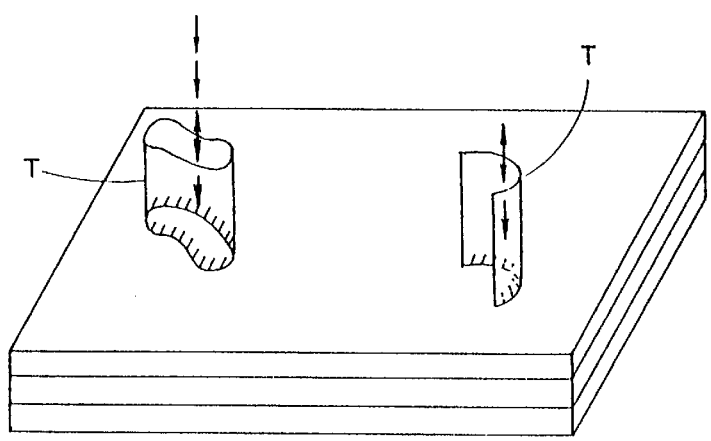
Fig.9a  Fig.9b

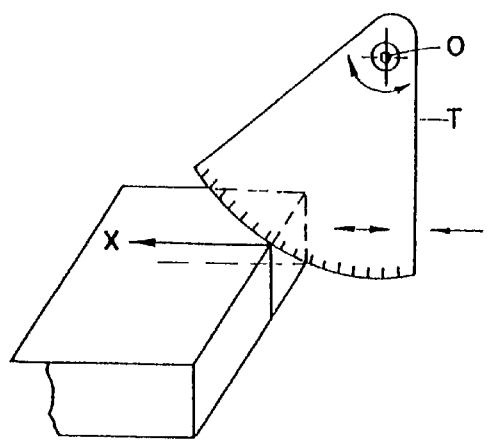
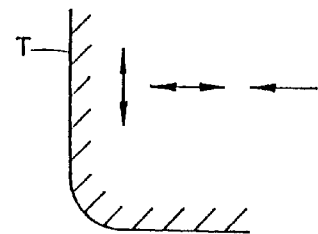
Fig. 10  Fig. 11
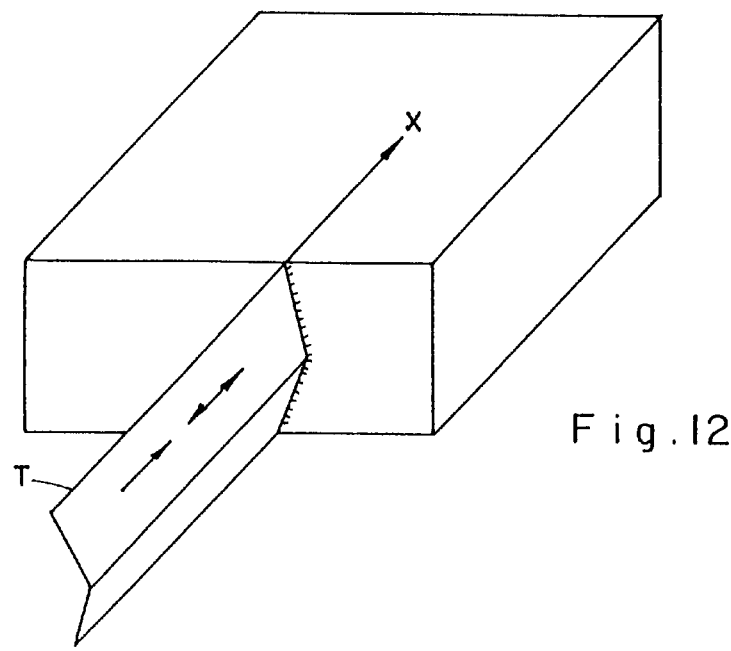
Fig. 12
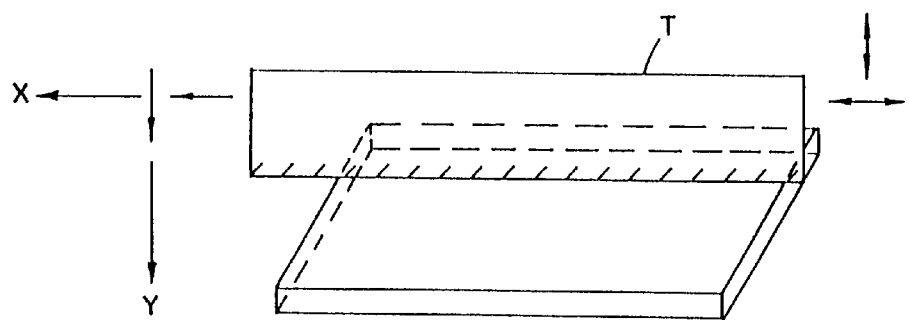
Fig. 13

PENETRATED TOOL SYSTEM

This is a continuation of application Ser. No. 08/351,364, filed Jun. 20, 1995 abandoned which is a 371 of PCT/GB93/01248, filed Jun. 11, 1993.

FIELD OF THE INVENTION

This invention relates to a penetrating tool system. In such a tool system, a penetrating tool is designed to penetrate a workpiece, for example by piercing, boring, drilling, cutting, sawing, shearing, milling or the like.

BACKGROUND OF THE INVENTION

Examples of such penetrating tool systems are cutting machines of differing types such as saws, drills, sewing machines, planers, shearing mechanisms or the like. These systems can be incorporated in hand-held or portable tools or in fixed machine tools. With all such known systems, there is imparted to the penetrating tool or to the workpiece with respect to the tool, a basic displacement which can be linear or rotational or a combination thereof, and which can be uni-directional or reciprocating and by virtue of which in all these cases a penetration action is provided. Thus, for example, a hand saw has imparted to it a reciprocating linear basic displacement, and this is also the case with the needle of a sewing machine.

In most cases, however, with known penetrating tool systems, the penetration of the tool into the workpiece involves a significant energy consumption (and consequent heat generation) as well as in many cases the generation of waste (possibly contaminating) material such as sawdust or the like.

Thus, for example, most hand-held power drills for drilling in concrete or the like involve the use of a hammer or impact mechanism which, in addition to involving a high degree of energy consumption, also includes relatively expensive components which have to be frequently replaced.

It is an object of the present invention to provide a new and improved penetrating tool system wherein the above-referred-to disadvantages and drawbacks are substantially reduced and overcome.

BRIEF SUMMARY OF THE INVENTION

According to the present invention, there is provided a penetrating tool system for penetrating a workpiece, said system comprising:

providing a penetration action in element;

a basic displacement means for establishing a basic displacement between the workpiece and the penetrating element during which basic displacement said penetration action is provided;

an auxiliary displacement means for imparting to said penetrating element an auxiliary reciprocating displacement superimposed on said basic displacement during said penetration action and having a frequency and amplitude which frequency and amplitude are substantially invariant in time, independent of reactions of the workpiece to penetration, said frequency of the auxiliary reciprocating displacement being substantially greater than a frequency of said basic displacement;

a balancing means for generating a force in said system so as to substantially counterbalance inertial loads and reactions in said system set up by said auxiliary reciprocating displacement, said force being directed substantially along said auxiliary reciprocating displacement in the direction opposite the direction of the auxiliary reciprocating displacement.

In order to ensure that the auxiliary reciprocating displacement imparted to the penetrating element is, in fact, substantially invariant in time, the means for imparting the auxiliary reciprocating displacement to the penetrating element is characterized by so-called "rigid constrained kinematics" where all elements, which these means comprise, are rigid and are connected with each other in a mechanical fashion and interact with each other in a rigid manner and in this, the system is distinguished from most hitherto known or proposed systems wherein any reciprocating displacement imparted to the penetrating element (for example, by electromagnetic, hydraulic or pneumatic means or by means of devices comprising classic elements such as elastic elements, springs or the like which vibrate upon deformation) are such that the vibrations are not invariant in time with respect to the reactions of the workpiece. At the same time, there is improved both the technological operation in general and the quality of the penetrated surface in particular. Thus, by virtue of the invention, it is possible to achieve entirely new types of technological operations such as, for example, the cutting of an entire range of materials without the generation of dust or chips, as well as drilling of concrete or the like without the use of hammer drills.

With tool systems in accordance with the present invention, the imparting of such an auxiliary reciprocating displacement to a penetrating element during the penetration action considerably facilitates the penetrating action and is accompanied by a significant reduction in power consumption.

With the auxiliary reciprocating means as above, in particular hand-held tools, means are provided, in accordance with the present invention, for generating, within the tool inertial forces which act in line with and which are oppositely directed to the forces generated by the auxiliary displacements so as at least partially to counterbalance these forces and in this way to reduce to a minimum any undesirable vibrations experienced by the user.

Whilst the provision of such counterbalancing inertial forces are almost invariably provided, in the case of hand-held tools, with stationary mounted tools, the provision of such counterbalancing forces need generally only be provided where the imparted auxiliary reciprocating displacement is of an amplitude greater than about 0.5 mm.

As stated, there must always be established between the penetrating element and the workpiece a basic relative displacement by virtue of which the penetration action is provided. This can, for example, in the case of a piercing element such as, for example, a knife, a pin or a punch, be a uni-directional linear displacement into and through the workpiece or, in the case of a drill, can be a uni-directional rotary displacement. Such a basic, uni-directional linear displacement can, of course, be imparted to the piercing element by the pressure exerted by the user on the tool against the workpiece.

Alternatively, the basic displacement can be a reciprocating motion such as, for example, that of a sewing machine needle or a saw, the frequency thereof being substantially less and the amplitude being substantially greater than those of the imparted auxiliary reciprocating displacement. The imparted auxiliary reciprocating displacement can be a simple, linear reciprocating motion, for example imparted to a piercing element along the axis thereof or can be a reciprocating rotational movement. In the case of a substantially rotationally symmetrical element, such as a drill, the imparted auxiliary displacements can take the form of reciprocating linear translational or reciprocating rotational displacements or appropriate combinations thereof.

A suitable range of frequencies for the imparted auxiliary displacements lies between 50–500 Hz, a preferred frequency being substantially 100 Hz. A suitable range of amplitudes lies between 0.1–10 mm, a preferred amplitude being substantially 1–2 mm for a cutting element and up to about 0.5 mm for a drilling tool. Thus, it is clear that the auxiliary reciprocating displacement having such characteristics is, in fact, an oscillation superimposed on the basic displacement of the tool. The particular frequencies and amplitudes adopted depend on the material of the workpiece. Thus, for example, the less elastic the material the higher the frequency to be chosen. Furthermore, the more brittle material the larger the amplitude to be chosen.

BRIEF SUMMARY OF THE DRAWINGS

For a better understanding of the present invention and to show how the same may be carried out in practice, reference will now be made to the accompanying drawings, in which:

FIGS. 1a–1d constitute a legend explaining the displacement symbols used in the subsequent drawings:

FIGS. 2 through 13 show schematically differing types of displacements imparted to a penetrating element;

DETAILED DESCRIPTION OF PREFERRED EMBODIMENTS

Figure 14:
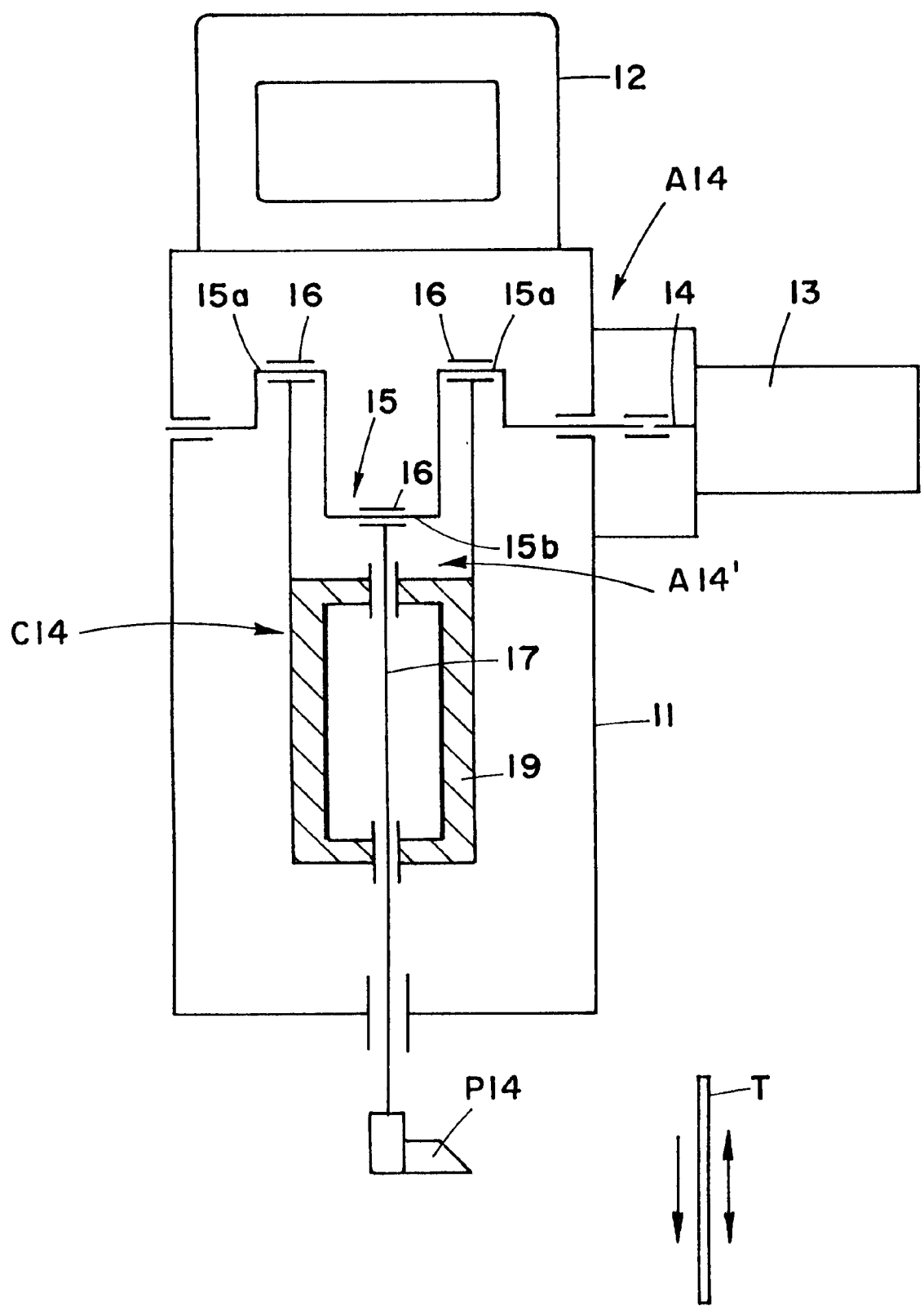
FIG. 14 is a schematic representation of a hand-held penetrating tool having a linearly displaceable penetrating tool element in accordance with the invention.

As seen in FIG. 1, basic displacements are indicated by single-headed arrows, whilst auxiliary reciprocating displacements are indicated by double-headed arrows. Thus, FIG. 1a illustrates a linear basic displacement, whilst FIG. 1b illustrates a rotary basic displacement, FIG. 1c illustrates linear auxiliary reciprocating displacements and FIG. 1d illustrates an angular auxiliary reciprocating displacement.

As seen in FIG. 2, a cutting tool (in all cases indicated as T) has imparted to it a linear basic displacement on which is superimposed a linear auxiliary reciprocating displacement.

In the embodiment shown in FIG. 3, the tool is provided with combined linear and rotary basic displacements on which is superimposed a linear auxiliary reciprocating displacement.

In the embodiment shown in FIG. 4, the tool is provided with a linear basic displacement on which is superimposed an angular auxiliary reciprocating displacement.

In the embodiment shown in FIG. 5, the tool has imparted to it a linear basic displacement on which are superimposed combined linear and angular auxiliary reciprocating displacements.

In the embodiment shown in FIG. 6, the tool has imparted to it combined linear and rotary basic displacements on which are superimposed combined linear and angular auxiliary reciprocating displacements.

In the embodiment shown in FIG. 7, the tool has imparted to it a basic linear reciprocating motion on which is superimposed a linear auxiliary reciprocal displacement.

Thus, FIGS. 2 through 7 can be variously representative of tool systems wherein the penetrating element consists of a pin, a needle, a knife, drill bit, saw or the like.

With a tool element T as shown in FIG. 8 of the drawings which can, for example, have an irregularly shaped cutting edge, the tool T can have a basic linear displacement with respect to the X and Y axes and/or a basic rotary displacement about an axis O. To these basic displacements there are superimposed auxiliary reciprocal displacements with respect to the X and Y axes and/or auxiliary reciprocal angular displacements either with respect to the same axis O or with respect to any other axis O.

Where the penetrating element is constituted by a tool which is symmetrical about its longitudinal axis such as, for example, a punch or a helical drill, then the tool system can have imparted to it any of the displacements as represented in any of FIGS. 2 through 7. Where, however, the tool system incorporates a punch which, for example as shown in FIGS. 9a and 9b of the drawings, is not symmetrical about its longitudinal axis whether, as shown in FIG. 9a, having a cutting edge of closed shape or whether, as shown in FIG. 9b, having a cutting edge of open shape, then only the displacements represented in FIG. 2 can be utilized. Similarly, where the tool system is designed to perforate a workpiece with a non-circular but otherwise symmetrical hole (for example, a square hole), a punch having a square cutting edge can be employed and in this case, too, only displacements represented in FIG. 2 can be imparted to it.

In the embodiment shown in FIG. 10, a cutting, penetrating element having a curved cutting edge is pivotally mounted about an axis O and there is imparted to the penetrating element a linear basic displacement in the direction X. There is superimposed on this basic displacement an angular auxiliary reciprocating displacement about the same axis and/or a linear auxiliary reciprocating displacement in the same direction X.

FIG. 11 illustrates the use of a planar cutting element to which is imparted a linear translational basic displacement and combined linear auxiliary reciprocating displacements, one being in the direction of the basic motion and the other being at a right angle thereto.

FIG. 12 illustrates the use of a cutting element T having a pair of cutting edges which are disposed at an angle to each other and to which are imparted a linear basic displacement in the direction X and a linear auxiliary reciprocating displacement in the same direction. Such a cutting element can be employed for making a profiled cut in the workpiece.

FIG. 13 illustrates the use of a guillotine-type cutting element which is provided with a linear basic displacement in both X and Y directions and to which is imparted a linear and/or angular auxiliary reciprocating displacement at right angles thereto.

There will now be described with reference to FIGS. 14 to 30 of the drawings, various examples of embodiments of penetrating tool systems and the means for imparting to the penetrating element during the penetration action the auxiliary reciprocating displacement and, the desired basic displacement by virtue of which the penetration action is provided. In all embodiments, the basic displacement is effected either by a user or by appropriate means.

FIG. 14 is a schematic representation of a hand-held penetrating tool in accordance with the invention. The tool comprises a casing 11 having a handle 12 for a user to hold the tool and to impart thereto a basic displacement, a penetrating element P14 and an auxiliary displacement means generally designated as A14. The auxiliary displacement means A14 comprises an auxiliary displacement drive motor 13 mounted to the casing 11 and having a drive shaft 14 drive coupled to an auxiliary displacement transmission device A14' comprising a crankshaft 15 which is rotatably journalled within the casing 11, a motion conversion mechanism 16 and a linear drive shaft 17. The crankshaft 15 comprises a pair of outer cranks 15a and an inner crank 15b. The inner crank 15b is coupled via the motion conversion mechanism 16 to the linear drive shaft 17 which extends out of the casing 11 and is coupled to the penetrating tool element P14. Such a motion conversion mechanism (hereinafter "a motion conversion mechanism") is designed to convert a rotational motion in the first shaft 14 to a linear reciprocal motion in the second shaft 17 normal to the first shaft. Such a mechanism can, for example, consist of the so-called "Scotch Yoke" mechanism.

The outer cranks 11a are, in their turn, coupled via motion conversion mechanisms 16' to a counterweight 19 through which the drive shaft 17 extends. The outer cranks 15a, the motion conversion mechanisms 16' and the counterweight 19 constitute a balancing means C14.

In use, the rotary drive provided by the motor 13 results in the rotation of the crankshaft 15 and the consequent rotational displacement of the intermediate crank 15b is transmitted to the drive shaft 17 in the form of a linear, reciprocating displacement, the motion conversion mechanism 16 ensuring that only a linear displacement in the axial direction of the drive shaft 17 is transmitted.

At the same time, the rotational displacement of the outer cranks 15a results in a linear, reciprocating displacement of the counterweight 19 which is 180° out of phase with respect to the displacement of the crankshaft 15 and the penetrating tool element 18. Here again, the coupling of the outer cranks 15a to the counterweight 19 via the motion conversion mechanism 16' ensures that the rotational displacement of the cranks 15 is transmitted to the counterweight 19 solely in the form of a reciprocating linear displacement in a sense opposite to that of the tool element P14.

In operation, the penetrating element P14 has imparted thereto a basic linear displacement as a result of the forces exerted by the user against the workpiece and, at the same time, the rotation of the crankshaft 15 results in imparting to the penetrating element P14 a linear, auxiliary reciprocating displacement. As a result, penetration of the workpiece by the penetrating element P14 is facilitated. It will be seen that the transmission of the reciprocating displacement to the penetrating element P14 from the drive motor 13, being by way of a rotating crankshaft, involves a rigid kinematic transmission, as a result of which the frequency and amplitude of the auxiliary reciprocating displacement of the penetrating element P14 is substantially invariant in time with respect to the reactions of the workpiece to penetration.

The reciprocating displacement of the counterweight 19 is 180° out of phase with respect to the auxiliary reciprocating displacement of the penetrating element P14 and this ensures the generation of inertial forces in the element P15 which substantially counterbalance inertial loads in the tool set up by the auxiliary reciprocating displacement of the penetrating element P14. In this way, the vibrations of the tool felt by the user thereof are reduced to a minimum.

The magnitude of the counterbalancing forces created by the reciprocating displacement of the counterweight 19 is a function of the mass of the counterweight 19 and the amplitude of its reciprocating displacement. These parameters can therefore be chosen so as to ensure effective counterbalancing.

The penetrating element P14 itself can consist of a knife or blade of any desired shape for cutting or scraping, or can consist of a pointed, penetrating element useful for making apertures. Alternatively, the penetrating element can consist of one or more pin-like elements which can be employed for making an array of apertures in a board or other material, for example in the preparation of electric circuit boards.

Figure 15:
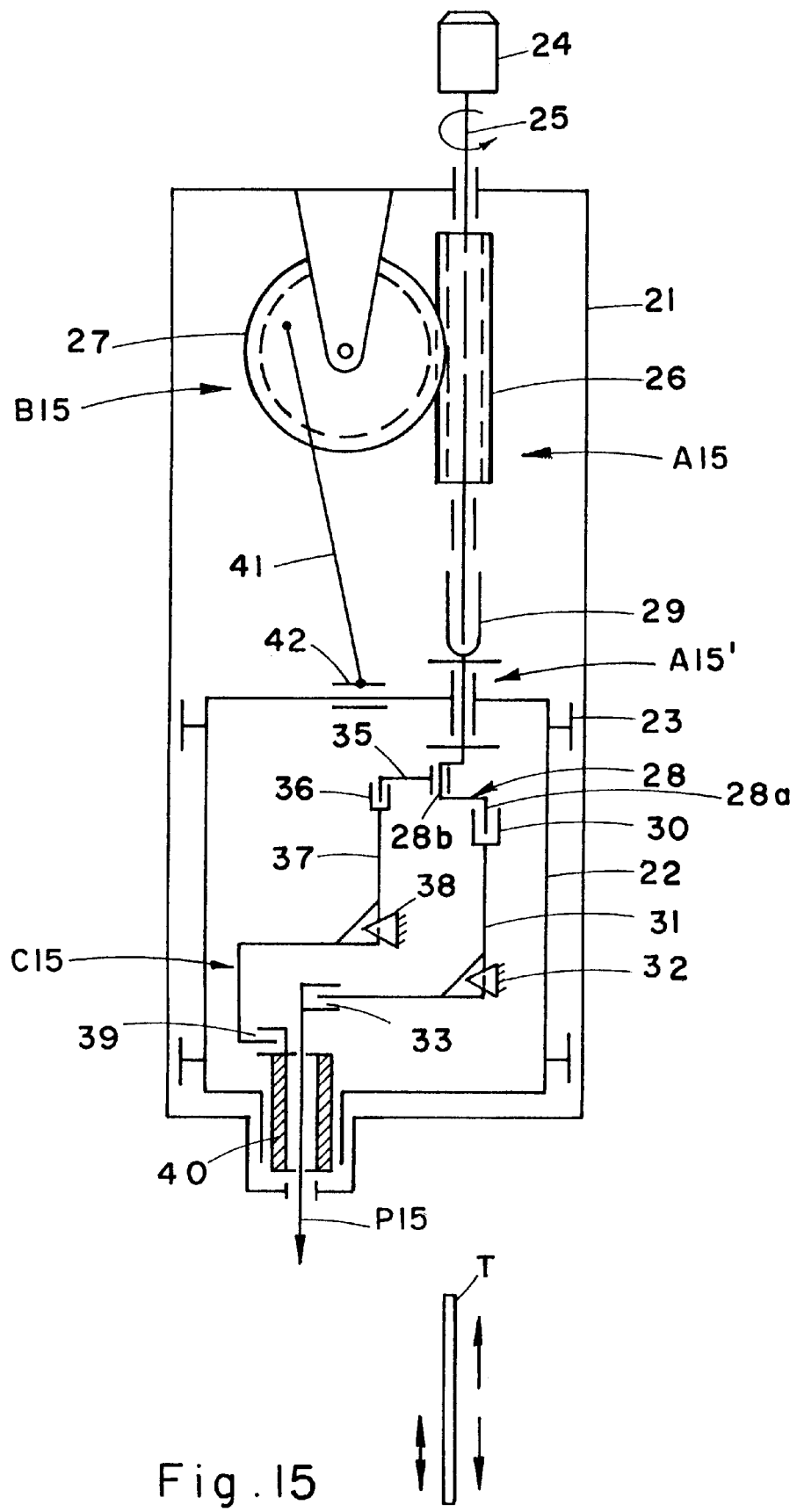
FIG. 15 is a schematic representation of a further form of penetrating tool having a linearly displaceable penetrating tool element in accordance with the invention.

In the further form of penetrating tool shown in FIG. 15 of the drawings, the penetrating tool system comprises an outer casing 21 within which is mounted an inner casing 22 by means of guides 23 such that the inner casing 22 is free to effect limited reciprocal displacements in the direction of the longitudinal axis of the outer casing 21 and with respect to the outer casing 21. The penetrating system further comprises a penetrating element P15, a rotary drive motor 24 from which the motion is transmitted to a basic displacement transmission device B15 for imparting to the penetrating element P15 a basic displacement, and to an auxiliary displacement transmission device A15 for imparting to the penetrating element P15 an auxiliary displacement. The rotary drive motor 24 has a rotary shaft 25 which extends into the outer casing 21 and is drive-coupled to the basic displacement transmission device B11 comprising a worm wheel 26 which is in turn coupled to a rotary worm gear 27 rotatably mounted with respect to the outer casing 21. The auxiliary displacement means A15 comprises a crankshaft 28, located within the inner casing 22, is coupled through the inner casing 22 to the drive shaft 25 via a coupling 29, the latter being such as to allow for relative longitudinal displacement of the crankshaft 28 with respect to the drive shaft 25. A first crank 28a of the crankshaft 28 is coupled, via a coupling 30, to an angled oscillating bar 31 which is pivotally supported at a median corner thereof by a bracket 32 which is fixed with respect to the inner casing 22. The end of the oscillating bar 31 remote from the coupling 30 is coupled by means of a suitable coupling 33 to a spindle 34 to which is to be mounted a penetrating tool. A second crank 28b of the crankshaft 28 is coupled via a connecting rod 35 and a coupling 36 to an angled oscillating bar 37 which is pivotally supported at a median corner thereof by a bracket 38 fixedly supported with respect to the inner casing 22. The end of the oscillating bar 37 remote from the coupling 36 is coupled via a coupling 39 to a counterweight 40 surrounding the spindle 34. The oscillating bar 37 and the counterweight 40 constitute a balancing means C15.

A crank rod 41 is pivotally coupled at an upper end thereof eccentrically with respect to the worm gear 27 and, at a lowermost end thereof, via a coupling 42 to the inner casing 22.

In operation, the motor 24 imparts a rotary drive to the crankshaft 28, as a result of which there is imparted to the oscillating bars 31 and 37 pivotally directed oscillations in respectively opposite senses. These pivotally directed oscillations are, in their turn, imparted, on the one hand, to the spindle 34 and, on the other hand, to the counterweight 40 and so, whilst the spindle 34 and the penetrating element P15 coupled thereto has imparted to it a linear auxiliary reciprocating displacement, the counterweight 40 has imparted to it a linear reciprocating displacement in an opposite sense to that of the penetrating element.

At the same time, the motor 24 imparts to the worm gear 27 via the worm wheel 26 a rotary motion and this is transformed by the crank rod 41 via the coupling 42 into a motion which imparts to the inner casing 22 a linear basic oscillating displacement having an oscillation frequency which is very substantially less than that of the reciprocating displacement imparted to the penetrating element P15 and the counterweight 40. This oscillating motion of the inner casing 22 is transmitted to the spindle 34 and the penetrating element P15.

It will thus be seen that there is imparted to the spindle 34 and the penetrating element P15 a linear, reciprocal basic displacement and, at the same time, there is superimposed thereon a linear auxiliary reciprocal displacement of considerably greater frequency than that of the reciprocal basic displacement. At the same time there is imparted to the counterweight 40 a similar linear reciprocating displacement but in an opposite sense. By virtue of imparting to the counterweight 40 a reciprocating displacement opposite in direction to the relatively high frequency auxiliary displacements imparted to the penetrating element, the vibrations transmitted to the user of the device or the mountings thereof are substantially reduced. Clearly, the penetrating element P15 can be constituted by a saw blade, the tool being an effective, hand-held sawing machine.

Figure 16:
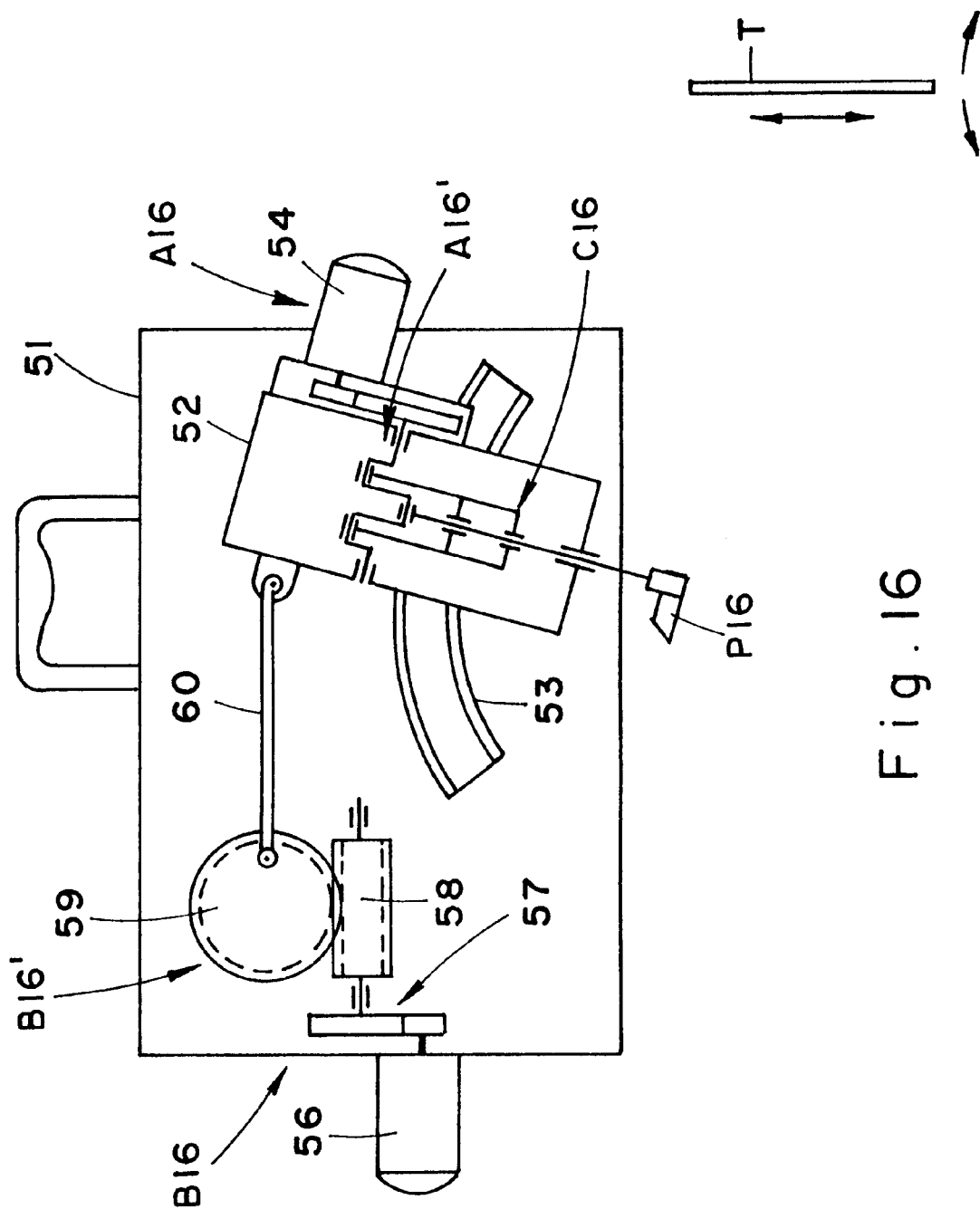
FIG. 16 is a schematic representation of a further tool in accordance with the invention, and incorporating the cutting tool mechanism as shown in FIG. 14.

Referring to FIG. 16 of the drawings, the hand tool there shown is essentially a cutting tool having a penetrating element P16, auxiliary and basic displacement means A16 and B16 by a virtue of which there is imparted to the penetrating element P16 an arcuate, reciprocating basic displacement and, superimposed thereon, a linear auxiliary reciprocating displacement. As seen in the Figure, the tool comprises a main casing 51 and, mounted therein, a further casing 52 which is reciprocally displaceable with respect to an arcuate guide 53 formed in the main casing 51. The auxiliary displacement means A16 comprises an auxiliary displacement drive 54 and auxiliary displacement transmission device A16' connected with a balancing means C16, the mechanism being similar to that described in FIG. 14, to which reference can be made and which will therefore not be described in any further detail.

The basic displacement means B16 comprises a basic displacement second drive motor 56 mounted on the casing 51, having a drive shaft coupled via a spur gear and coupling shaft arrangement 57 to a basic displacement transmission device B16' comprising a worm 58 which, in its turn, is coupled to a worm gear 59. The worm gear 59 is coupled peripherally by a coupling rod 60 to the casing 52.

Thus, upon actuation of the drive motor 56 the drive is transmitted via the gear arrangement 57 and the worm 58, worm gear 59 and coupling rod 60 to the casing 52, which is constrained to reciprocate in an arcuate path defined by the arcuate guide 53. In this way, there is imparted to the cutting element 55 the basic reciprocating, arcuate displacement. At the same time, actuation of the motor 54 imparts to the cutting element 55 the linearly-directed auxiliary reciprocating displacement of considerably higher frequency than that of the reciprocating basic displacement and of considerably less amplitude.

Figure 17:
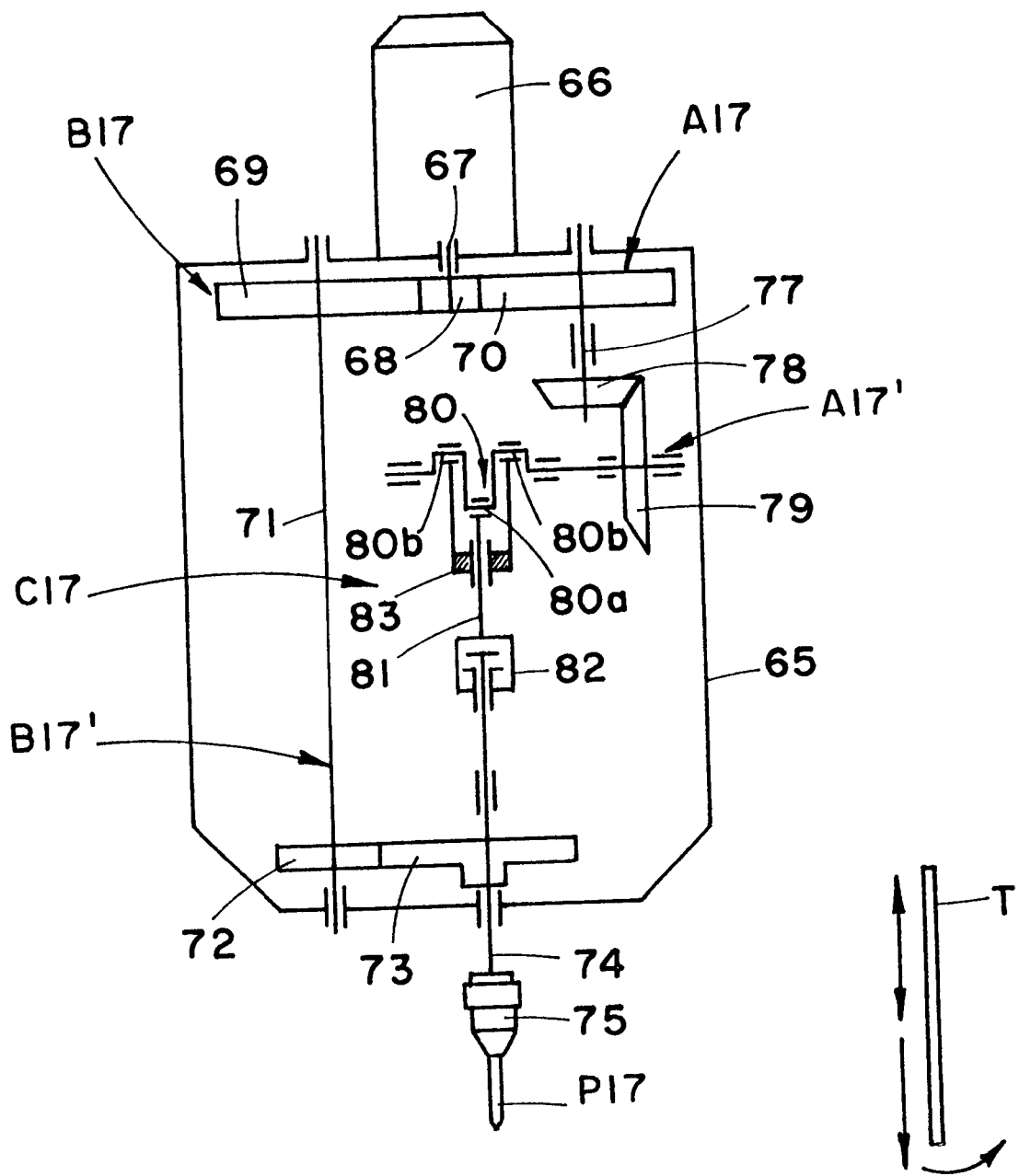
FIG. 17 is a schematic representation of a rotary hand drill in accordance with the invention.

Reference will now be made to FIG. 17 of the drawings, which illustrates schematically a hand-held rotary drill in accordance with the invention. As seen in the drawing, the rotary drill comprises a casing 65 to which is fitted a drive motor 66 connected with a basic displacement means B17 and an auxiliary displacement means A17. The motor drive 66 has a drive shaft 67 which rotatably drives a spur gear 68, and via the spur gear 68, a pair of spur gears 69, 70 of basic and auxiliary displacement transmission devices B17' and A17' of the basic displacement means B17 and auxiliary displacement means A17, respectively. The spur gear 69 of the basic displacement transmission device B17' is coupled by means of a coupling shaft 71 to a spur gear 72 and, thereby, to a further spur gear 73 which, in its turn, is coupled to a spindle 74 coupled at its free end to a chuck 75 having fitted therein a drill bit P17. In this way, the drive motor 66 serves to impart a basic rotary drive displacement to the spindle 74 and the drill bit 76.

The spur gear 70 of the auxiliary displacement transmission device 17' is coupled, via a coupling shaft 77, to a pair of bevel gears 78, 79, the bevel gear 79 being coupled to a rotary crankshaft 80 journalled within the casing 65. A central crank 80a of the crankshaft 80 is coupled, via a suitable motion conversion mechanism, to a linear displacement shaft 81. The shaft 81 is coupled to the drive spindle 74 via a coupling mechanism 82 which allows for the rotation of the spindle 74 with respect to the linear displacement shaft 81, but nevertheless effects transmission of linear displacement from the linear displacement shaft 81 to the spindle 74.

The rotary drill further has a balancing means C17 comprising a pair of outer cranks 80b of the crankshaft 80 coupled via a motion conversion mechanism to a counterweight 83.

Thus, the rotary drive from the motor 66 is transmitted via the bevel gears 78, 79 to the crankshaft 80 and the rotation of the latter is transformed into a linear auxiliary reciprocating displacement of the spindle 74 and, in consequence, of the drill bit 76. At the same time, the counterweight 83 has imparted to it a reciprocating displacement 180° out of phase with respect to the auxiliary reciprocating displacement of the drill bit 76. There is therefore generated in the tool a force which counterbalances the vibrations in the tool generated by the auxiliary reciprocating displacement of the drill bit 76.

Thus, the hand-held drill illustrated in FIG. 17 of the drawings is provided with a conventional basic rotary displacement and, superimposed thereon, a linear auxiliary reciprocating displacement. Furthermore, by virtue of the provision of the counterweight, the user of the drill is effectively protected against the effect of vibrations in the tool resulting from the auxiliary reciprocal displacement of the drill bit.

Figure 18:
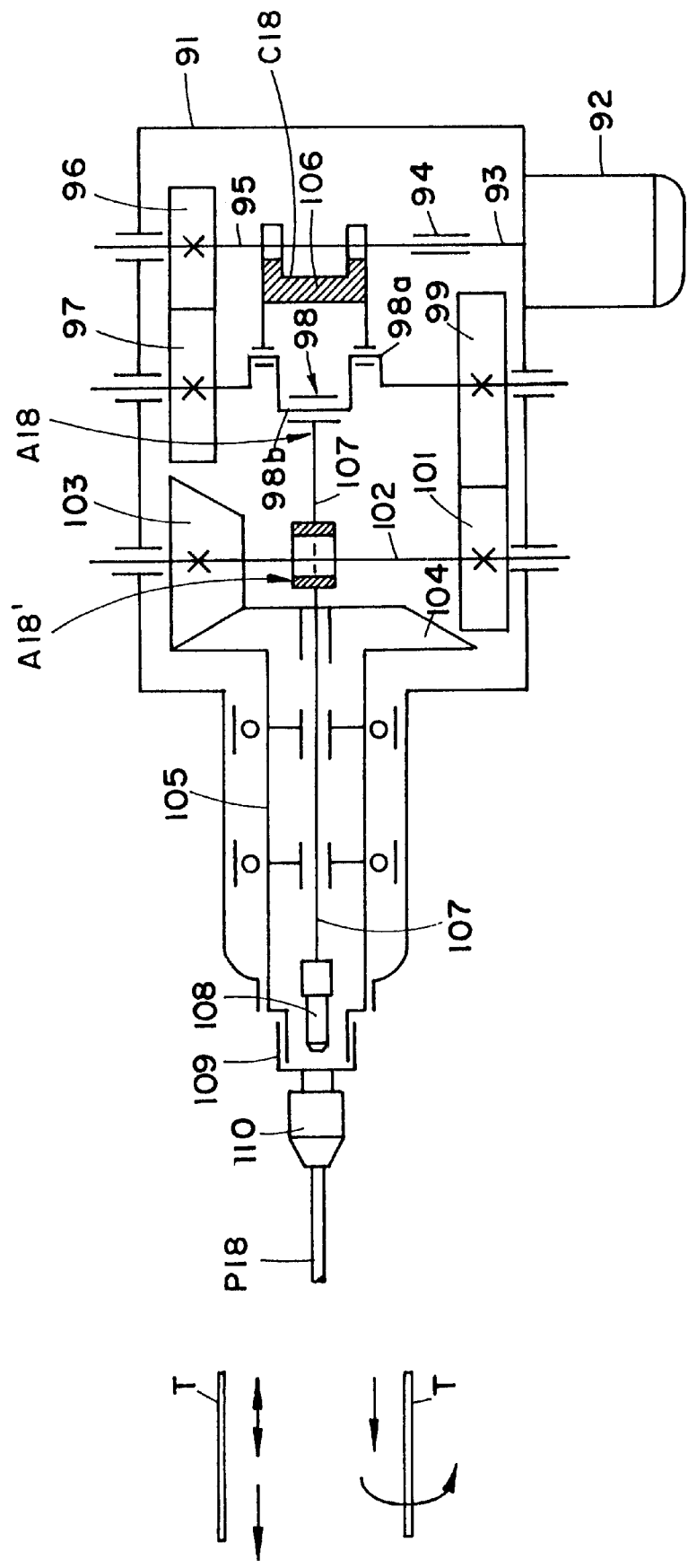
FIG. 18 is a schematic representation of a hand-held tool capable of alternate use as a linearly displaceable penetrating tool, or as a rotary drill in accordance with the invention.

Reference will now be made to FIG. 18 of the drawings, in which is schematically illustrated a hand-held tool capable of alternate use as a linearly displaceable penetrating tool, or as a rotary drill. The tool comprises an outer casing 91 and a drive motor 92 having a drive shaft 93 coupled via a coupling 94 to a driven shaft 95. The driven shaft 95 is connected via a crankshaft 98, with an auxiliary displacement transmission device A18 for imparting to the tool a linear auxiliary reciprocating displacement, when the tool is used as a linear displaceable tool, and via a combination of spur wheels 96, 97, 99, 101, the crankshaft 98, a coupling shaft 102 and bevel gears 103 and 104, to an elongated sleeve 105, for imparting to the tool a rotary motion, when the tool is used as a rotary drill.

One pair of cranks 98a of the crankshaft 98 is coupled to a balancing system C18 comprising a counterweight 106 whilst an intermediately disposed crank 98b is coupled via an auxiliary displacement transmission device A18' to one end of a longitudinally extending shaft 107. The opposite end of the shaft 107 is coupled to a tool mounting element 108. As shown in the drawing, a coupling cap 109 is fitted to the end of the sleeve 105. A chuck 110 is coupled to the cap 109 and can have coupled thereto a penetrating element P18 (e.g. a drill). Thus, a drill bit can be coupled to the chuck 110, in which case the tool operates as a rotary drill. Alternatively, the chuck 110 and the coupling cap 109 can be removed and a penetrating tool element (e.g. a knife) can be directly coupled to the tool mounting element 108, in which case the tool element operates in accordance with the invention as a vibrating penetrating tool.

In operation, when it is desired to use the tool, in accordance with the invention, as a penetrating tool with, for example, a knife-like penetrating element, the coupling cap 109 is removed and the penetrating element is directly coupled to the tool mounting element 108. The rotary drive generated by the motor 92 is transmitted to the crankshaft 98 and the rotation of the crankshaft 98, and particularly the crank 98b thereof, transmits a linear auxiliary reciprocating displacement to the coupling shaft 107 and, in consequence, to the tool mounting element 108 attached to the tool. There is at the same time induced a corresponding reciprocating linear displacement of the counterweight 106, which displacement is 180° out of phase with that of the shaft 107 and the tool mounting element 108.

The provision of the counterweight 106 and ensuring that the reciprocating displacement thereof is 180° out of phase with that of the tool mounting element 108 ensures that the user of the tool or the mount thereof is effectively protected against undesirable vibrations when using the tool.

When, however, it is desired to use the tool as a rotary drill, the cap 109 is fitted on to the end of the spindle 105 and a drill bit is fitted in the chuck 110. The rotary drive generated by the motor 92 is transmitted via the drive shaft 93 and driven shaft 95, gear wheels 96, 97, crankshaft 98, gear wheels 99, 101, bevel gears 103, 104 to the elongated spindle 105 and, via the coupling cap 109, to the chuck 110 and the drill bit.

In this case, as can be seen, the interposition of the coupling cap 109 ensures that the drill bit is not coupled to the mounting element 108 and therefore there is not directly transmitted to it linear reciprocating displacements. Thus, the tool effectively operates as a conventional rotary drill.

It will be noted, however, that whilst the linear auxiliary reciprocating displacements are not directly transmitted to the drill bit, the counterweight 106 continues to be subjected to reciprocating displacement. This reciprocal displacement generates in the tool an auxiliary vibration which is transmitted to the drill bit and significantly improves the drilling process.

It will be appreciated that whilst the transmission of this auxiliary vibration to the drill bit is not a rigid kinematic transmission, it has been found, however, that such auxiliary vibrations are nevertheless still effective in improving the drilling operations where the amplitude of the auxiliary vibrations are not greater than about 0.5 mm, and the diameter of the drill bit is not greater than about 12 mm.

It will be appreciated that with the tool just described there is imparted to the tool a basic linear displacement into the workpiece as a consequence of a force or pressures exerted by the user.

Figure 19:
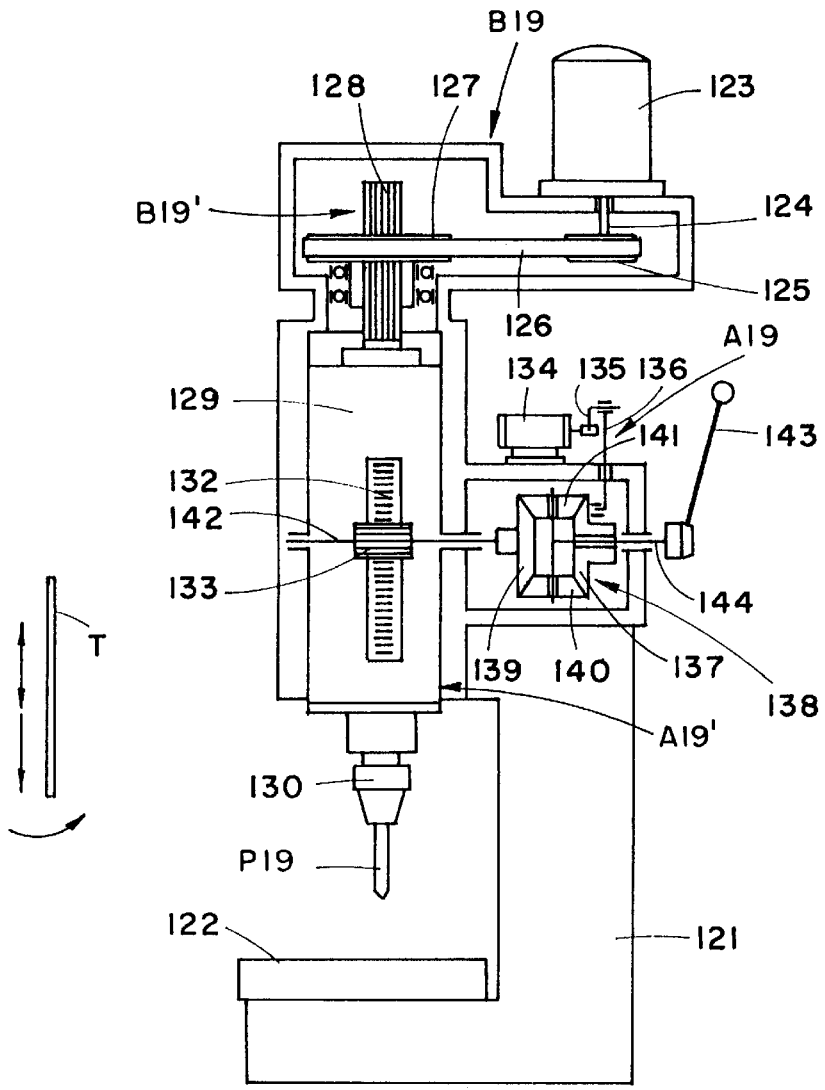
FIG. 19 is a schematic representation of a first form of stationary drilling/milling machine in accordance with the invention.
Figure 19A:
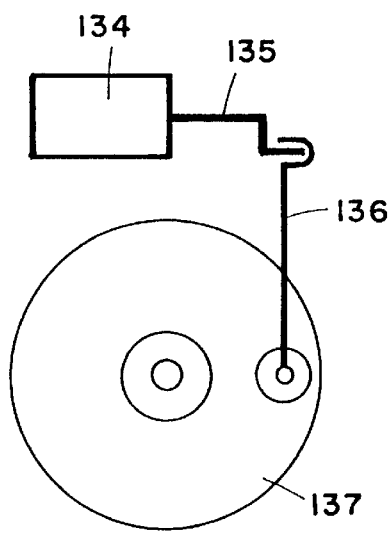
FIG. 19a is a schematic side view of a portion of the tool shown in FIG. 19.

Reference will now be made to FIGS. 19 and 19a of the drawings, which illustrate schematically a stationary, drilling/milling machine wherein FIG. 19a is a schematic side elevation of a portion of the mechanism shown in FIG. 19. The machine comprises a rigid frame 121 having a workpiece receiving base 122. jAs seen in FIG. 19, the machine has a penetrating element P19 in the form of a drill bit, a basic displacement means B19 and an auxiliary displacement means A19. The basic displacement means B19 comprises a drive motor 123 mounted in the frame and having a drive shaft 124 connected with a basic displacement transmission device generally designated as B19'. Thus, the drive shaft 124 is coupled by means of a drive pulley 125 and drive bolt 126 with a driven pulley 127. A splined rotary shaft 128 is coupled to the driven pulley 127 so as to be rotatable therewith, but so as to be capable of relative axial, linear displacement with respect thereto. The splined shaft 128 is coupled to a sleeve 129 axially displaceable within the frame 121 so as to be axially displaceable therewith but so as to be independently rotatable with respect to the sleeve 129. Rotation of the splined shaft 128 is transmitted to a chuck 130 in which is fitted a drill bit P19. The coupling is such that the chuck 130 and the drill bit 131 is axially displaceable together with the sleeve 129 and the splined shaft 128, but is rotatable independently of the sleeve 129.

Mounted on the sleeve 129 is an axial rack 132 which cooperates with a rotary pinion 133.

Auxiliary displacement means A19 comprises a drive motor 134, mounted on the frame 121, and connected with an auxiliary displacement transmission device generally designated as A19'. Thus, drive motor 134 drives a rotary crank drive 135 (see FIG. 19a) which is coupled by means of a coupling shaft 136 to a peripheral portion of an input bevel gear 137 of a differential bevel gear mechanism 138, which furthermore includes an output bevel gear 139 and side bevel gears 140, 141. The output bevel gear 139 is mounted on an axle 142 on which is also mounted the pinion 133.

A rotary drill displacement handle 143 is coupled to an axle 144 which, in its turn, is coupled to the side bevel gears 140, 141.

In operation, rotary displacement of the handle 143 gives rise to rotational displacement of the pinion 133 and, in consequence, a linear displacement of the sleeve 129 and a consequent linear basic displacement of the drill bit P19. When the drill bit P19 has been lowered into contact with the workpiece, the rotary drive provided by the motor 123, transmitted to the splined shaft 128, imparts a basic rotary displacement to the drill bit P19. In addition, however, the rotary drive provided by the motor 134, when transmitted through the differential mechanism, imparts to the pinion 133 a rotary reciprocating displacement which, in its turn, imparts to the rack 132, the sleeve 129 and the drill bit P19, an auxiliary reciprocating linear displacement having a considerably higher frequency than the rate of basic rotational displacement of the drill bit P19.

The drill bit P19 can be readily replaced by a suitable milling element. The tool just described provides an effective means for drilling or milling workpieces and, by virtue of the imparted auxiliary reciprocal displacements, the drilling or milling is considerably, facilitated. In view of the fact that the tool is a stationary tool, there is in general no requirement for the balancing out of the vibrations induced in the tool as a result of the auxiliary reciprocal displacement of the tool element. Where, however, the amplitude of the auxiliary reciprocal displacements exceeds a certain maximum, the provision of such counterbalancing means may be required so as to protect the tool against undue wear and such provision can be readily envisaged.

Figure 20:
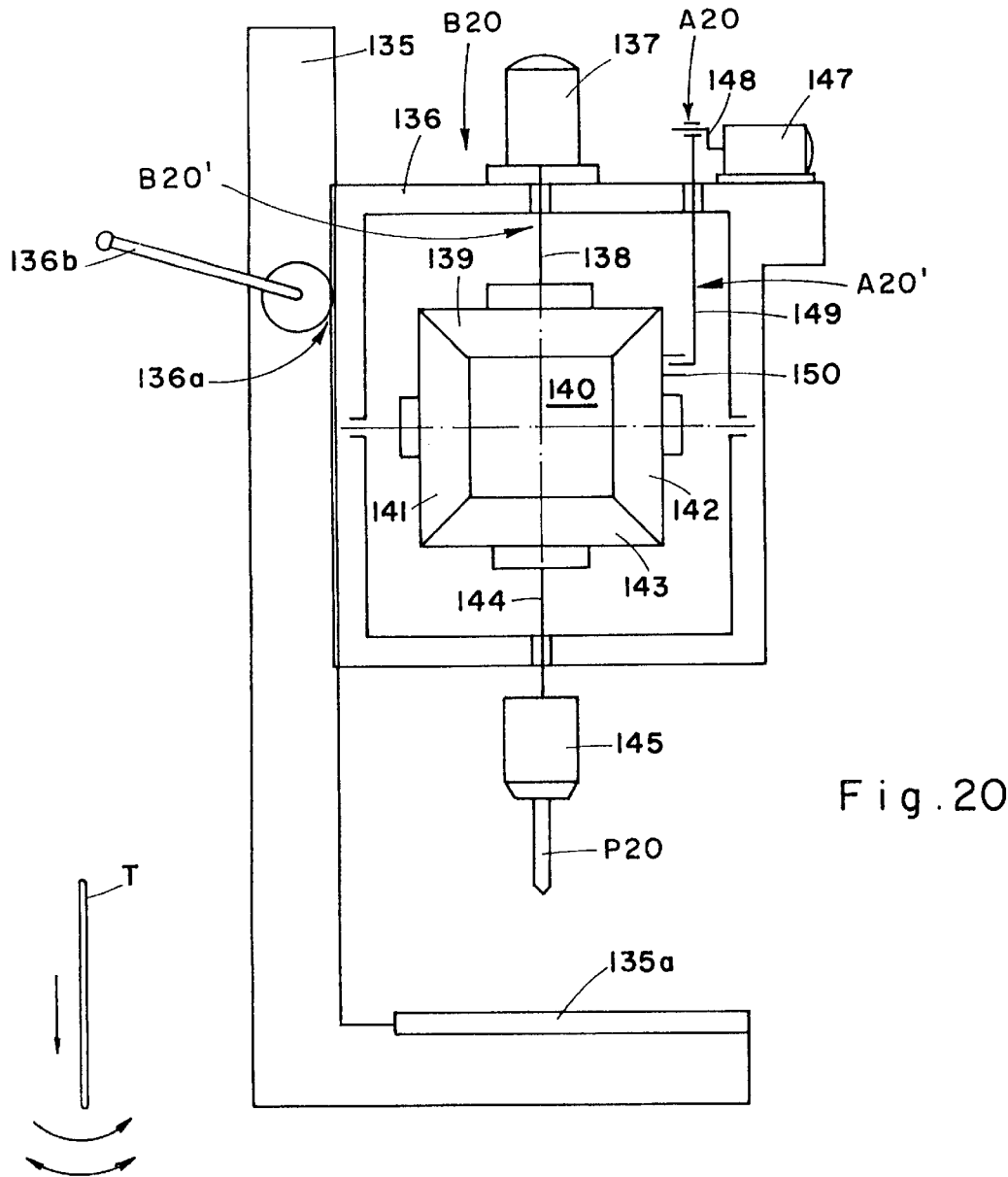
FIG. 20 is a schematic representation of a second form of stationary drilling/milling machine in accordance with the invention.
Figure 20A:
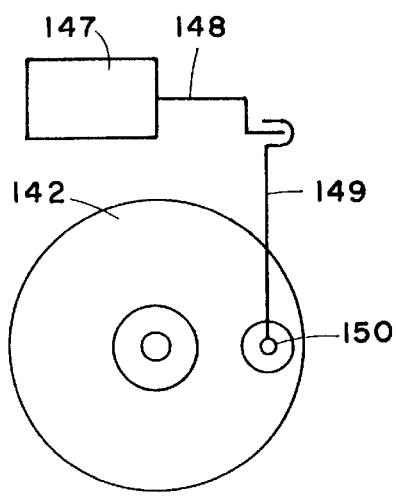
FIG. 20a is a schematic side view of a portion of the machine shown in FIG. 20.

Reference-will now be made to FIGS. 20 and 20a of the drawings, which show schematically a stationary drilling/milling machine, wherein the drilling/milling element has imparted thereto a basic rotary displacement and superimposed thereon, rotary or angular auxiliary reciprocatory displacements.

The machine comprises a rigid frame 135 having a workpiece receiving base 135a. A casing 136 is vertically mounted on the frame 135 and is axially displaceable with respect thereto by means of a rack and pinion arrangement 136a, actuatable by means of a rotary displaceable handle 136b. The system comprises a basic displacement means B20 and an auxiliary displacement means A20 for imparting to a penetrating element P20 basic and auxiliary displacements. The basic displacement means B20 comprises a drive motor 137 and a basic displacement transmission device connected therewith. Thus, the drive motor 137 is mounted on the casing 136 and has a drive shaft 138 coupled to a bevel gear 139 constituting a first input gear of a differential gear train 140. The differential gear train 140 furthermore comprises first and second side bevel gears 141, 142, the latter (142) also serving as a second input of the differential gear 140. The differential gear 140 is furthermore provided with an output bevel gear 143 coupled by means of a shaft 144 to a chuck 145 in which is mounted a drill bit P20.

The auxiliary displacement means A20 comprises second drive motor 147 mounted on the casing 136 and has an output which drives a crankshaft 148 coupled, bud means of an auxiliary displacement transmission device A20' to one end of a reciprocable shaft 149, the other end of which is coupled to an eccentric location 150 of the bevel gear 142.

In operation, the casing 136, together with the drilling or milling bit P20, is lowered by the rack and pinion arrangement 136a into engagement with a workpiece located on the workpiece receiving base 135a, thus imparting to the bit P20 a basic linear displacement. A drive imparted from the motor 137 is transmitted via the input bevel gear 139 and the side bevel gears 141, 142 to the output bevel gear 143 and from there to the chuck 145 and drill/milling bit P20, so as to impart thereto a basic rotary displacement.

In addition, the drive imparted by the motor 147 gives rise to a rotational displacement of the crankshaft 148, which rotational displacement is converted by the motion conversion mechanism into a linear reciprocating displacement of the shaft 149. As a result of the coupling of the lower end of the shaft 149 to an eccentric location 150 of the second input bevel gear 142, there is imparted to the bevel gear 142 an auxiliary rotary or angular reciprocating displacement, which is transmitted via the output bevel gear 143 to the chuck 145 and the drilling/milling bit P20. It is ensured that the frequency of the auxiliary reciprocal angular displacements imparted to the drilling/milling bit P20 is substantially greater than the rate of basic rotational displacement of the drilling/milling bit P20 derived from the drive originating in the motor 147. Thus, this auxiliary rotary reciprocation is superimposed on the basic rotary displacement of the drill and, in operation, this greatly facilitates drilling or milling operations.

Figure 21:
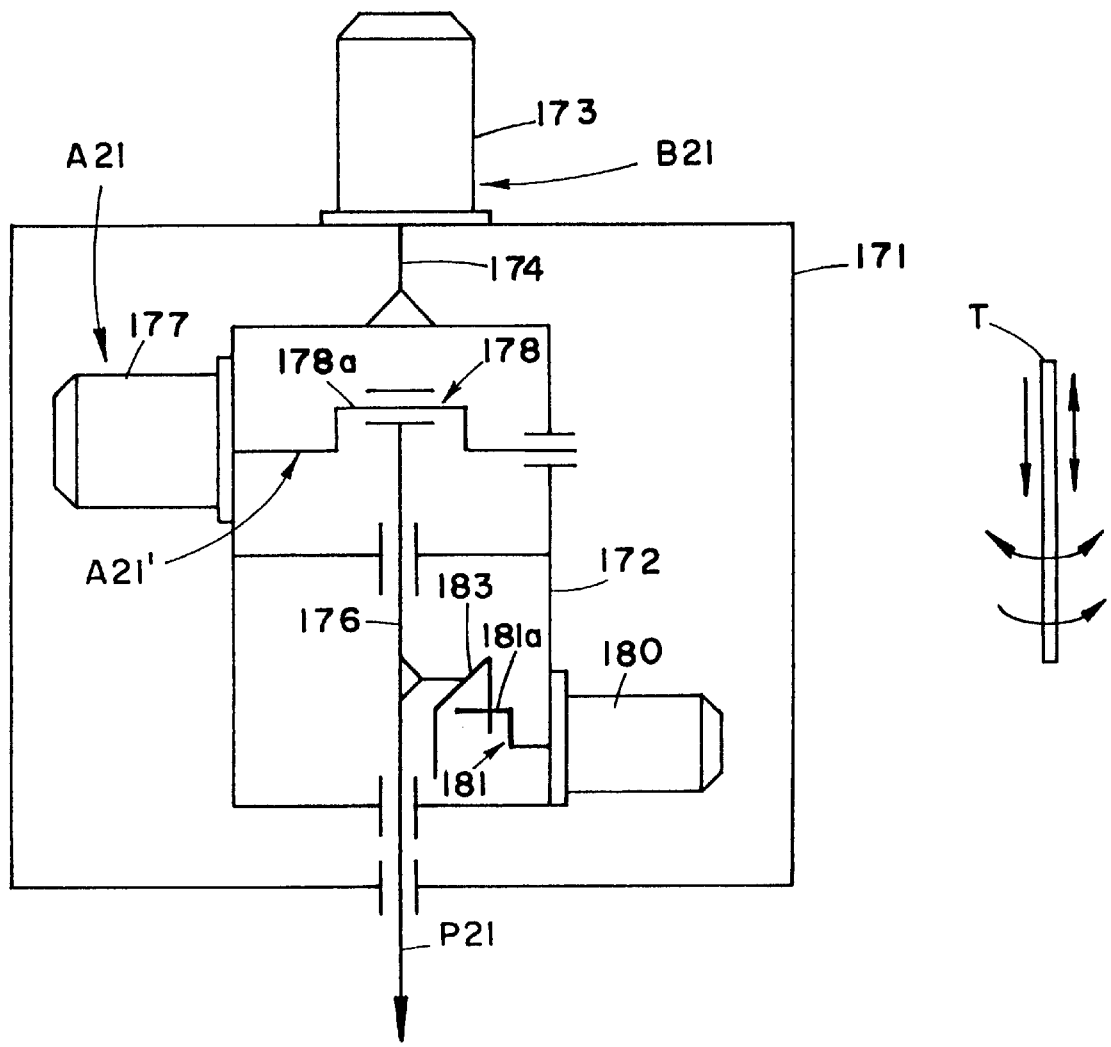
FIG. 21 is a schematic representation of a further form of rotary drill in accordance with the invention.

Reference will now be made to FIG. 21 of the drawings, which is a schematic representation of a tool such as, for example, a drill to which is imparted, by a basic displacement means B21, a rotary basic displacement and a linearly directed basic displacement, the latter resulting from the pressure exerted on the tool by the user. Superimposed thereon are combined linear auxiliary reciprocating displacements and rotary auxiliary reciprocating displacements provided by an auxiliary displacement provided by an auxiliary displacement means A21. As seen in the figure; the device comprises an outer casing 171 and an inner casing 172 which is rotatably mounted within the outer casing 171. The basic displacement means B21 comprises a first drive motor 173 mounted on the outer casing 171 and having a drive shaft 174 which extends into the outer casing 171 and is rigidly secured to the inner casing 172. A penetrating element P21 is coupled to a drive shaft 176 which extends through the casings 171 and 172 and is articulatedly coupled to the inner casing 172 so as to be capable of rotation with the inner casing 172 and so as to be free for relatively limited axial movement with respect to the casing 172.

The auxiliary displacement means 21 comprises a second drive motor 177 mounted on the outside wall of the inner casing 172 and connected with an auxiliary displacement transmission device A21' comprising a crankshaft 178 having a central crank 178a coupled to the shaft 176 so that when a rotary drive is imparted to the crank shaft 178 from the motor 177, the rotation of the crank 178a results in the linear axial auxiliary reciprocal displacement of the penetrating element P21.

A third drive motor 180 is fixedly mounted to the inner casing 172 and drives a crankshaft 181 having a crank 181a whose free end projects into a U-shaped coupling element 183 which is fixedly coupled to the drive shaft 176.

In use, the rotary drive generated by the motor 173 results in the rotation of the inner casing 172 and the consequent rotation of the penetrating element P21. In other words, the motor 173 imparts to the penetrating element P21 a basic rotational displacement. The drive motor 177, on the other hand, as previously explained, imparts to the penetrating element P21 a linear auxiliary reciprocating displacement. Finally, the third motor 180 which rotationally drives the crankshaft 181 imparts to the shaft 176 via the U-shaped coupling element 183 an auxiliary rotational displacement. In this way, the penetrating element 175 has imparted to it three displacements, namely a basic rotational displacement and a combined linear auxiliary reciprocal displacement and a rotational auxiliary reciprocating displacement. In addition, the force exerted bud the user on the tool in the direction of the workpiece, together with the weight of the tool, gives rise to a linear basic displacement of the penetrating element towards the workpiece. Additionally, the tool can be provided with counterweights, to which are imparted reciprocating displacements in opposite phase to the auxiliary displacements imparted to the penetrating element and, in this way, there are significantly reduced the vibrations which would otherwise be felt by the user of the tool.

Reference will now be made to FIGS. 22 through 26 of the drawings, which illustrate a stationary frame saw mechanism in accordance with the invention. As seen particularly in FIGS. 22, 23 and 24, the frame saw mechanism comprises a rigid frame 191 which supports a supporting platform 192 on which is mounted a timber routing means 193. Located upstream of the routing means 193 is a rotary friction feeding cylinder 194*a* coupled to a rotary displacing handle 195. Rotary displacement of the handle 195 serves to turn the friction cylinder 194*a*. A second rotary friction cylinder 194*b* is rotatably mounted on a pair of cylindrical sliding cuffs 196 which, in their turn, are slidably mounted on a pair of vertical support pillars 197. A piece of timber 198 to be sliced by the frame saw mechanism is routed by the routing means 193 towards the spaced-apart cylinders 194*a*, 194*b*, the cylinder 194*b* being biased towards the timber 198 by biasing springs 199. Rotation of the handle 195 rotates the friction cylinder 194*a* and results in the advance of the timber 198 towards the frame saw.

Figure 25:
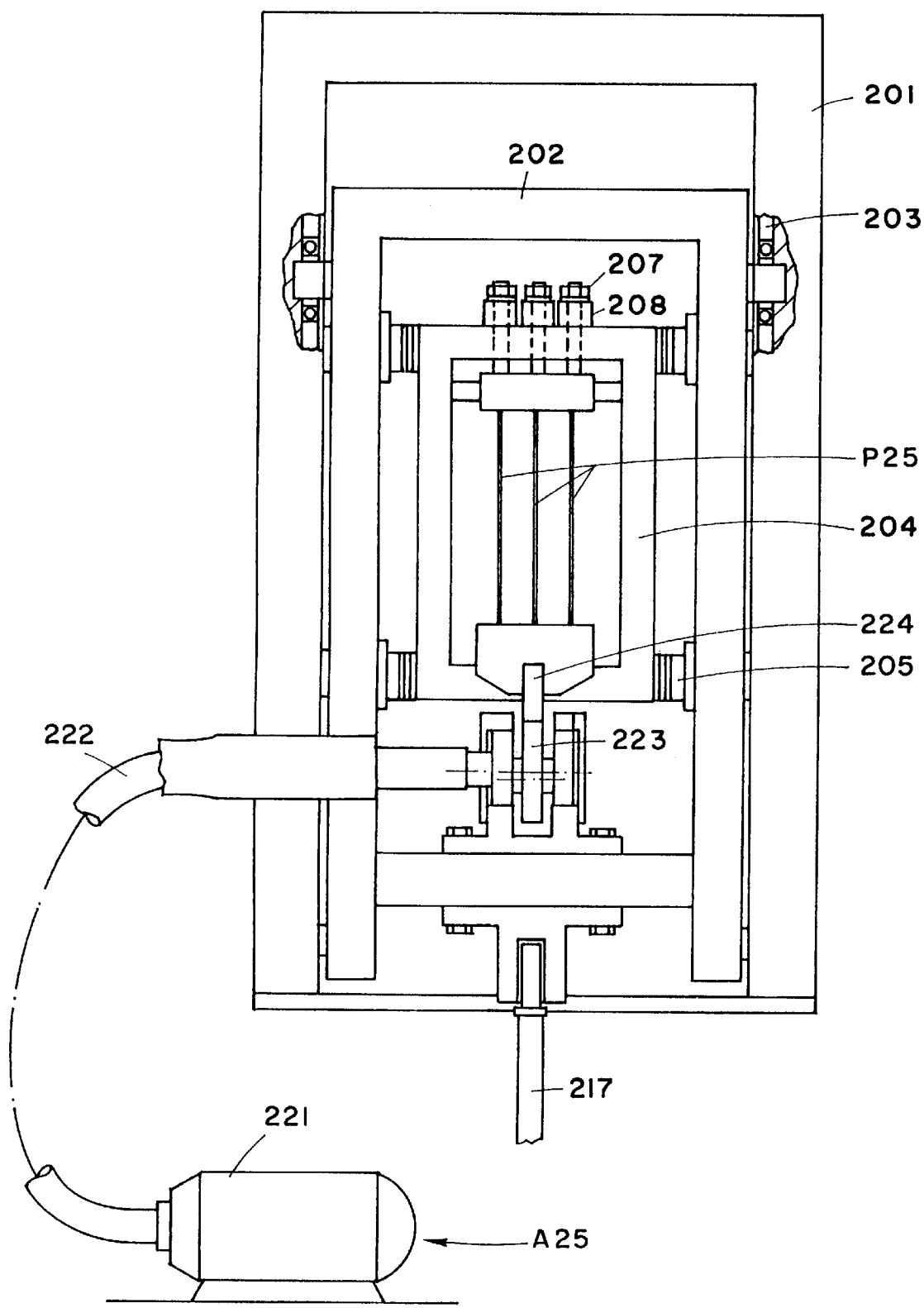
FIG. 25 is an elevation of a detail of the mechanism shown in FIG. 22.
Figure 26:
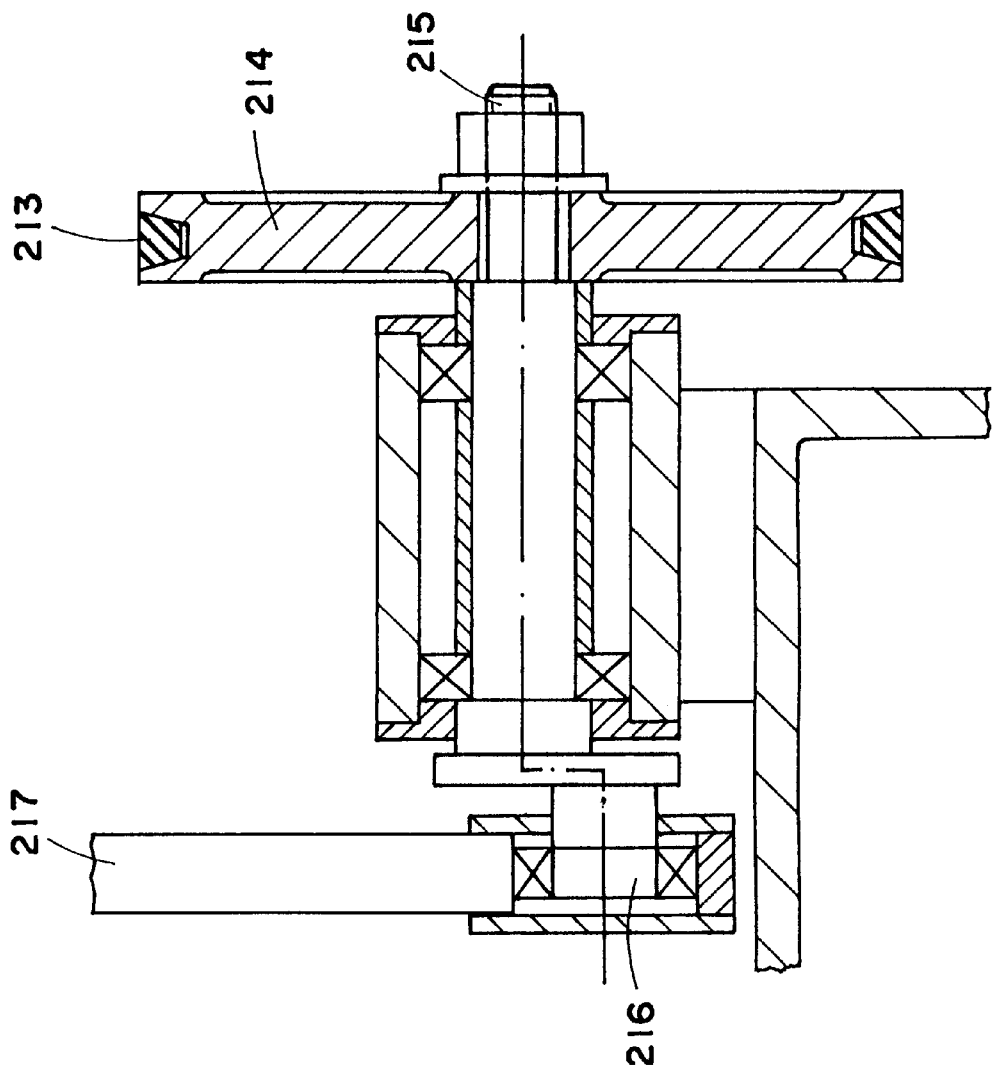
FIG. 26 is a cross-sectional view of a detail of the mechanism shown in FIG. 22.

Referring particularly to FIG. 25 of the drawings, the frame saw comprises an outer, rectangular frame 201 rigidly mounted on and extending vertically upwards from the platform 192. A second rectangular frame 202 is located within the first frame 201 and is linearly displaceable with respect thereto, the frame 202 being mounted on rails 203 on which displacement is effected. A third rectangular frame 204 is located within the second frame 202 and is rigidly mounted within the frame 202 by mountings 205. Three vertical sawing elements P25 are vertically mounted within the inner frame 204, being secured thereto by screws 207 and rubber compression studs 208 which allow for relative linear displacement of the sawing elements P25 with respect to the frame 204.

Figure 22:
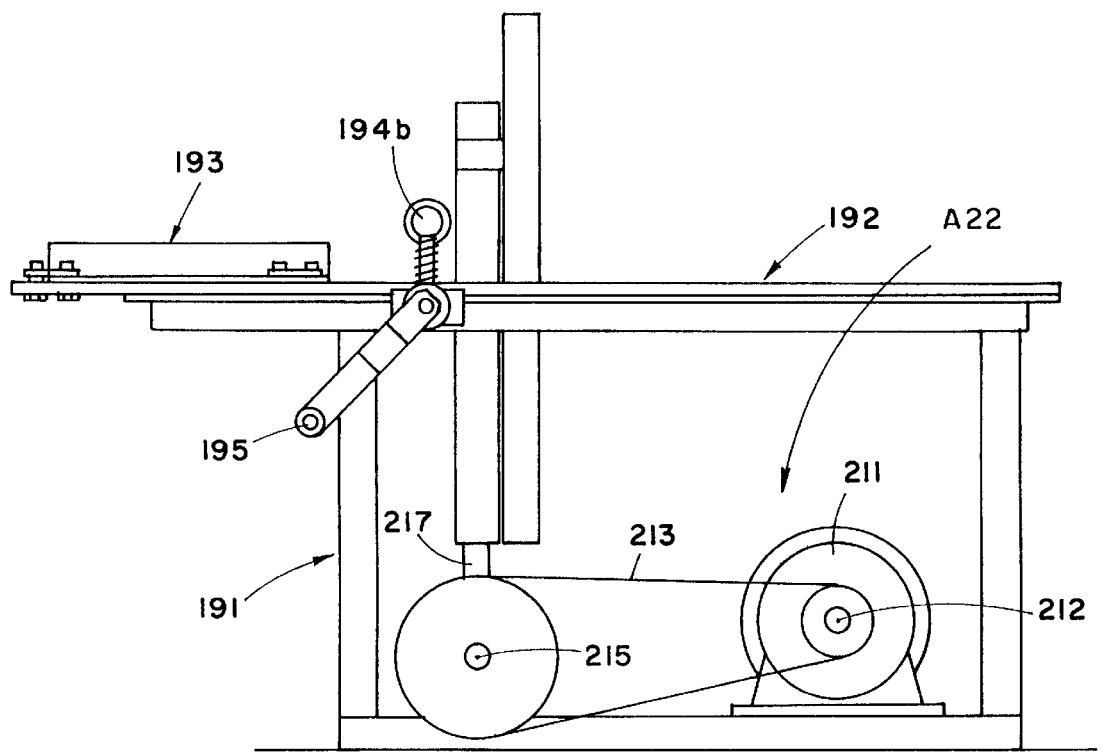
FIG. 22 is a side view of a stationary frame saw mechanism in accordance with the invention.
Figure 23:
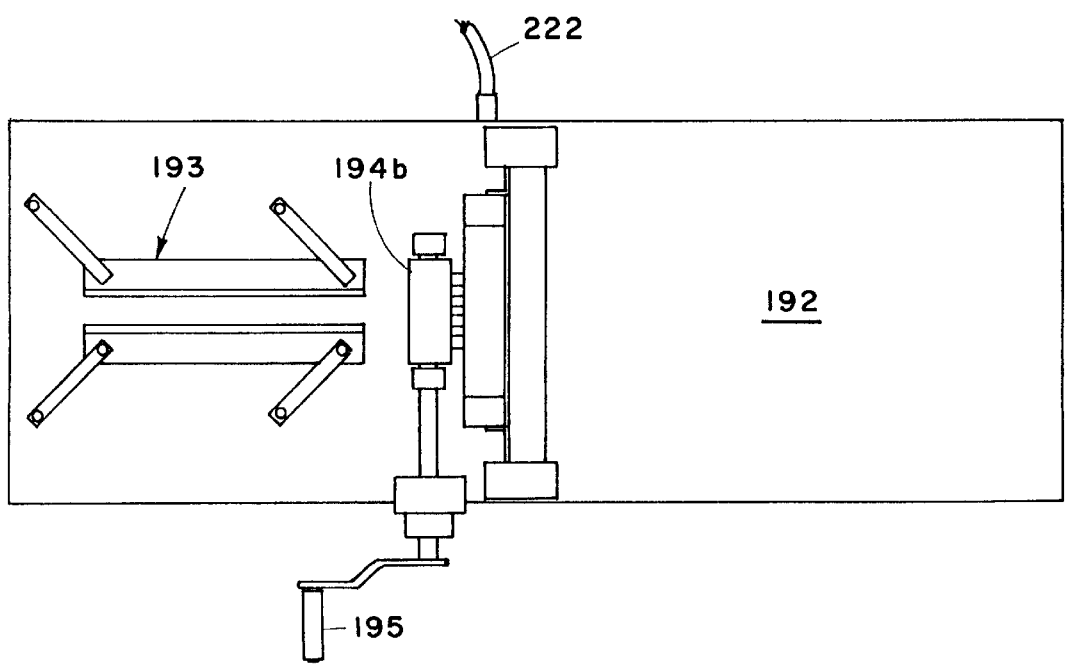
FIG. 23 is a plan view from above of the stationary frame saw mechanism shown in FIG. 22.
Figure 24:
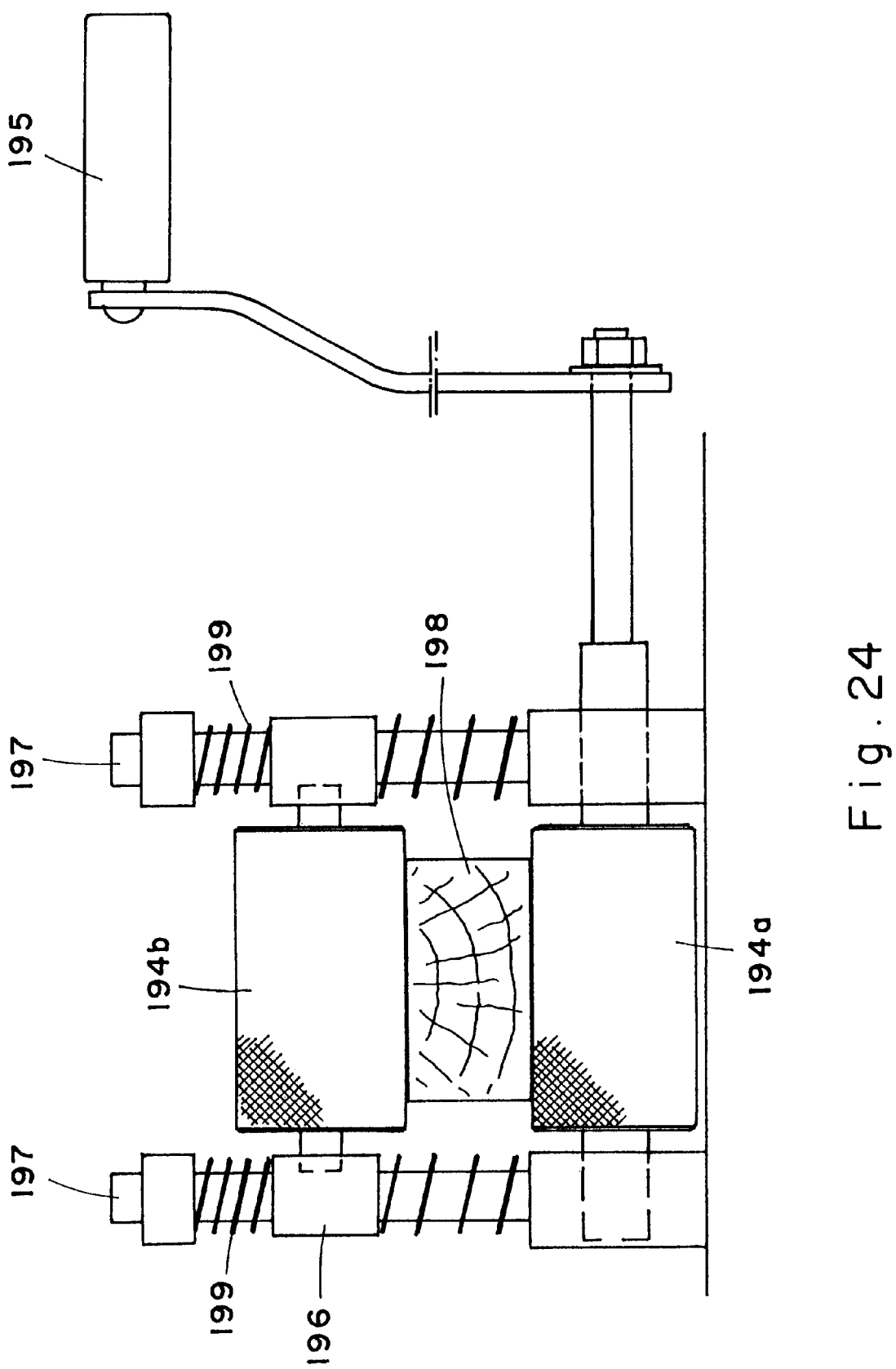
FIG. 24 is an end view of a detail of the mechanism shown in FIG. 2.

As seen in FIG. 22, the system has a basic displacement means A22 (FIG. 22) comprising a first motor 211 with a drive shaft 212 coupled, by means of a drive belt 213, to a pulley 214. The latter is mounted on an axle 215 which drives a crankshaft 216 to which is coupled, by means of a suitable motion conversion mechanism, a reciprocating rod 217, which, as shown in FIG. 25 of the drawings, is coupled to the frame 202. Thus, the motor 211 imparts, via the drive belt 213, pulley 214, axle 215, crankshaft 216 and reciprocating rod 217, a basic linear reciprocating displacement to the frame 202 and, via the frame 202 and the inner frame 204, to the saw elements P25.

As seen in FIG. 25 of the drawings, the system has an auxiliary displacement means A25 comprising a second drive motor 221 coupled via a flexible drive shaft 222 to a crankshaft 223 which, in its turn, is coupled via a linear reciprocating rod 224 with the saw elements P25. Thus, the second motor 221 transmits an auxiliary reciprocating displacement to the saw elements P25, having a frequency substantially greater than the frequency of the basic reciprocating displacement transmitted via the frame 202, and having an amplitude substantially less than the amplitude of the basic reciprocating displacements transmitted from the frame 202.

Thus, timber placed on the platform 192 is routed bye the routing means 193 and is advanced bad rotation of the handle 195 towards the innermost frame 204, where it is effectively sliced by the vibrating saw elements P25. It will be readily appreciated that the displacement of the timber towards the reciprocating saw elements can be effected mechanically as shown, or by suitable mechanized advance means.

Figure 27:
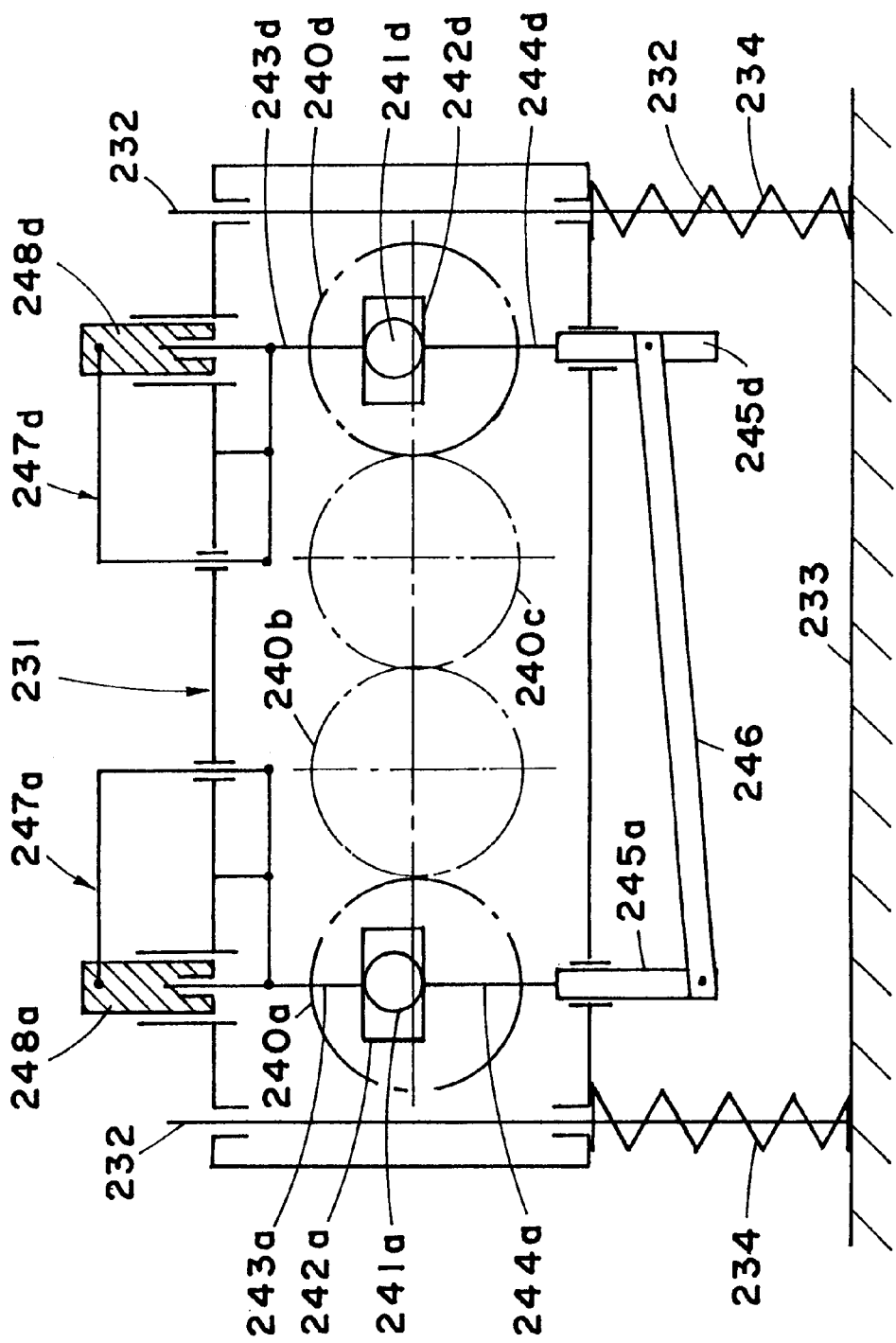
FIG. 27 is a schematic front elevation of a stationary penetrating tool mechanism with a linearly displaceable guillotine-type blade in accordance with the invention.
Figure 28:
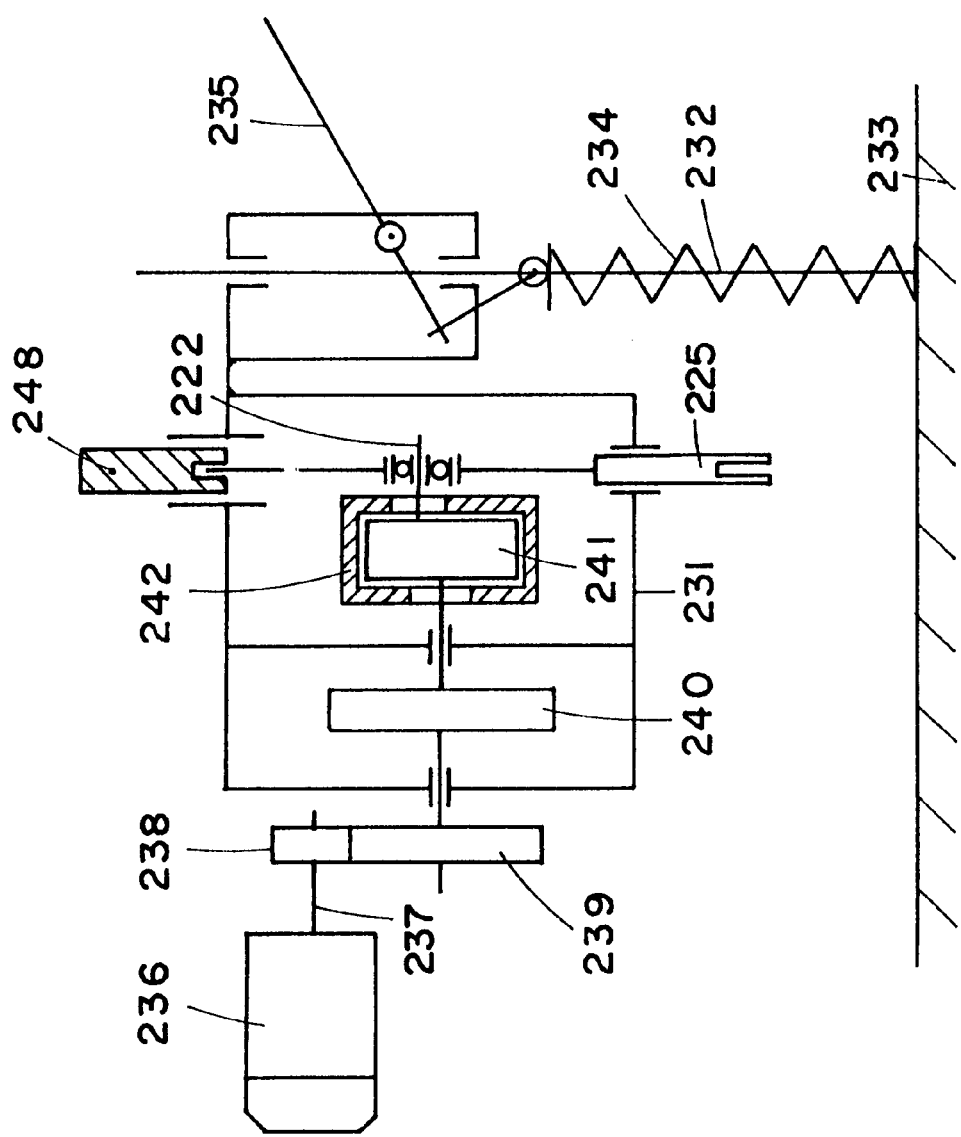
FIG. 28 is a schematic side view of the tool mechanism shown in FIG. 27.

Reference will now be made to FIGS. 27 and 28 of the drawings, which show schematically a stationary, guillotine-type cutting mechanism. As seen in the drawings, the mechanism comprises a horizontally disposed, rectangular frame 231 which is slidably mounted on vertical support posts 232, which are themselves rigidly mounted on a rigid support base 233, the frame being upwardly biased by means of compression springs 234. Lowering of the frame towards the base 233 is effected by means of a suitable, pivotally-mounted rotatable handle 235 which constitutes a basic displacement means. The system has an auxiliary displacement means comprising a drive motor 236 having its drive shaft 237 coupled via gears 238, 239 to a gear train 240*a*, 240*b*, 240*c*, 240*d*. The gears 240*a*, 240*d* are respectively associated with eccentrically mounted discs 241*a*, 241*d* located respectively within motion conversion mechanisms 242*a*, 242*d* designed, upon rotation of the eccentrically mounted discs 241*a*, 241*d*, to produce linear reciprocating outputs. These motion conversion mechanism 242*a*, 242*d* are in fact constituted by Scotch Yoke mechanisms.

The motion conversion mechanisms 242*a*, 242*d* are respectively coupled to upper and lower linear reciprocal displacement rods 243*a*, 244*a*, 243*d*, 244*d*.

The lower displacement rods 244*a*, 244*d* are respectively coupled to blade mounting rods 245*a*, 245*d* between which is mounted an elongated guillotine blade 246, mounting being effected at any desired angle of the blade vis-a-vis the base 233.

The upper reciprocating rods 243*a*, 243*d* are coupled, via suitable motion reversing linkages 247*a*, 247*d*, to counterweights 248*a*, 248*d*.

In use, and when it is desired to use the guillotine to cut suitable material placed on the bed 233, the franc 231 is lowered by means of rotary displacement of the handle 235 towards the material on the bed 233 and in this way a basic linear displacement is imparted to the blade 246. At the same time, the motor 236 imparts via the displacement rods 244*a*, 244*d* and supports 245*a*, 245*d* auxiliary linear reciprocating displacements of the blade 246, thereby considerably facilitating the penetration of the blade into the material to be cut. At the same time, there is imparted to the counterweights 248*a*, 248*d*, a reciprocating displacement in an opposite phase and, in this way, the overall vibration of the system is counterbalanced.

As previously indicated, the angle of the guillotine blade 246 can be readily adjusted by mounting it appropriately with respect to the supports 245*a*, 245*d*.

As an alternative to imparting the auxiliary reciprocating displacement to both ends of the blade 246 simultaneously in the same direction, it is possible, by reversing the eccentricity of one eccentrically mounted disc 241*a* with respect to the other eccentrically mounted disc 241*d*, to ensure that the support rods 245*a*, 245*d* respectively reciprocate in opposite directions and in this way there is imparted to the blade 246 an effective swinging oscillatory displacement which facilitates the penetration, or cutting, of hard or thick material, seeing that such swinging displacement decreases at any particular instant the area of contact between the blade and the material.

Whilst the mechanism just described involves the use of a guillotine-type blade, it can readily be appreciated that the blade can be replaced, for example by an array of piercing pins, so that the lowering of the array of pins towards an object, for example electronic circuit board, to be pierced and the imparting of the required auxiliary reciprocal displacement to the pins, results in the effective aperturing of the board in any desired pattern.

Figures 29, 30:
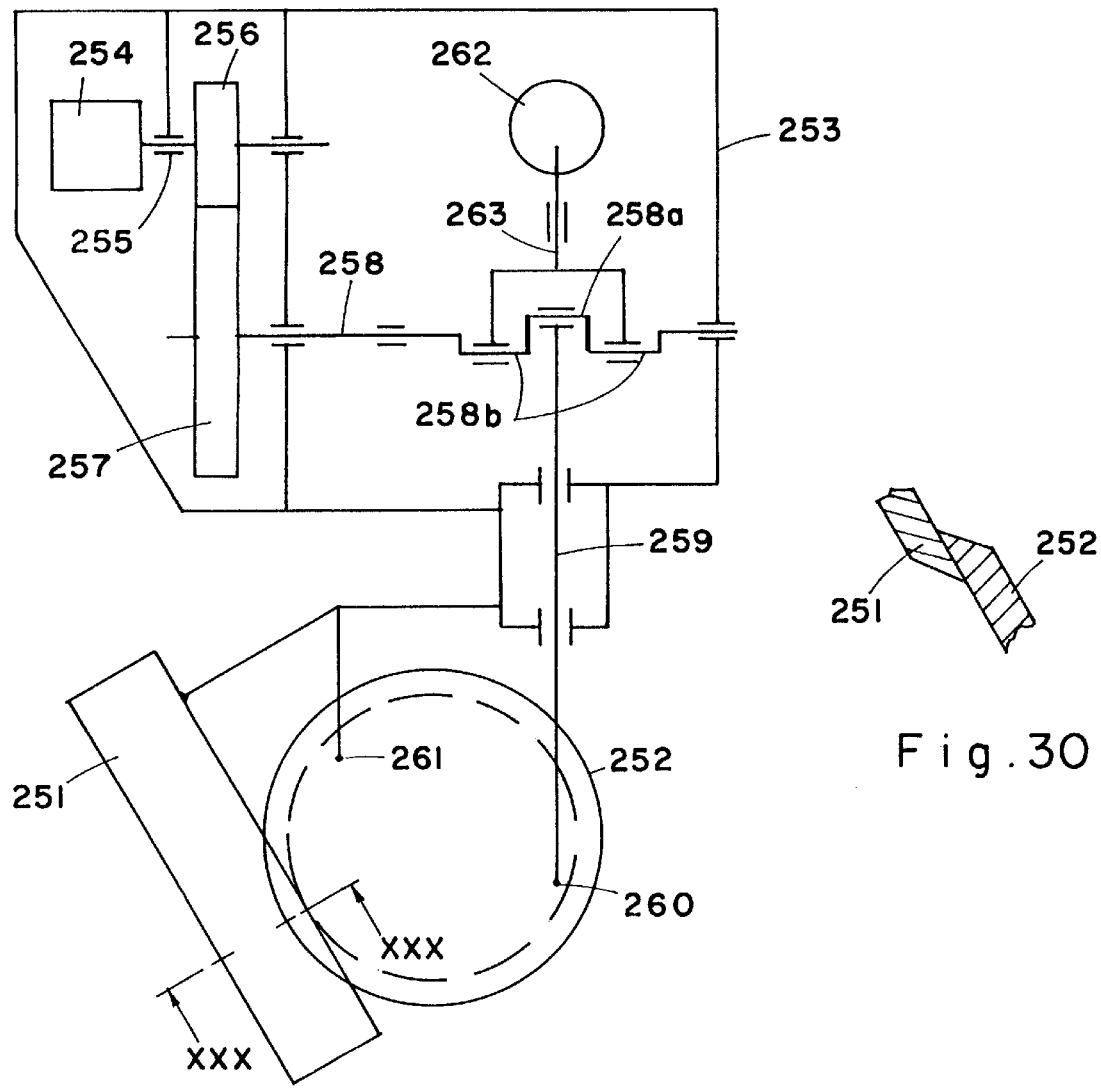
FIG. 29 is a schematic representation of a shearing type mechanism in accordance with the invention.
FIG. 30 is a cross-sectional view of a detail of the mechanism shown in FIG. 29, taken along the line XXX—XXX.

Referring now to FIG. 29 of the drawings, there is there schematically illustrated a shearing device for use in the cutting of sheets, for example, paper, metal, carpets, etc.

The device comprises a fixed shearing blade 251 and, juxtaposed with respect thereto, a rotatable disc shearing blade 252, the cooperating edges of the blade 251 and disc 252 being respectively pointed, as clearly shown in the cross-sectional view in FIG. 30 of the drawings. The device furthermore comprises a casing 253 in which is mounted a drive motor 254 having a drive shaft 255 which is coupled by a gear train 256, 257 with a crankshaft 258, having an innermost crank 258a and a pair of outer cranks 258b. The innermost crank 258a is coupled, via a suitable motion conversion mechanism, to a linear reciprocating rod 259 which is pivotally coupled at its opposite end to a peripheral portion 260 of the disc 252. The disc 252 is pivotally mounted at an opposite peripheral position 261 thereof with respect to the casing 253.

The outer cranks 258b are coupled, via suitable motion conversion mechanism, to a counterweight 262 via a reciprocable displacement rod 263.

In operation, a drive transmitted from the motor 254 to the crankshaft 258 gives rise to an angular auxiliary reciprocating displacement of the shearing disc 252 with respect to the blade 251. If now sheet material is introduced between the blade and the shearing disc, the auxiliary reciprocating displacement imparted to the disc considerably facilitates the cutting of this material. In this case, it will be appreciated that a basic, linear motion is imparted to the material to be cut.

At the same time as the angular auxiliary reciprocating displacement is imparted to the shearing disc, a corresponding reciprocating displacement is imparted to the counterweight 262, but in opposite phase to that imparted to the shearing disc, and in this way the vibrations induced in the tool are counterbalanced, thereby reducing very considerably the overall vibrations of the tool as a whole.

It will be appreciated that the shearing tool just described effectively consists of a hand-held penetrating tool of the same general kind as described with reference to FIG. 14 of the drawings and to which can be coupled as a separate, auxiliary component the particular shearing components 251 and 252.

Whilst in the embodiments just described various combinations of auxiliary reciprocating displacements and basic displacement have been illustrated and described, it will be appreciated that the invention is equally applicable to other combinations. In all cases, however, the displacements are directed along or with respect to the longitudinal axis of an essentially mono-dimensional (e.g. a pin) or a cylindrical piercing element, or are in the plane of a planar penetrating element.

Tools in accordance with the invention are capable of use in the penetration (drilling, cutting, planing, etc.) of workpieces of differing materials and shapes. It is pointed out, however, that in the case of very brittle materials, the penetrating element must be provided with means for the removal of particles which accumulate in the path of the penetrating element. Such means, of course, are already provided for with penetrating elements such as, for example, saw blades or drilling bits.

Furthermore, where the workpiece to be penetrated consists of a highly elastic material such as, for example, rubber or the like, means must be provided for compressing the workpiece prior to and during penetration. Similarly, where the tool is to be employed for penetrating non-homogeneous or imperfect materials, lateral force must be exerted on the workpiece so as to prevent any developing crack from advancing in an undesired direction.

In practical embodiments of penetrating tool systems to be used for cutting and/or drilling incorporating the mechanisms as shown schematically in FIGS. 14, 17 and 18 of the drawings, the penetrating elements had imparted to them auxiliary reciprocating displacements having a frequency range of 30–300 Hz (preferably 50–100 Hz) and an amplitude range of 0.02–3.50 mm (preferably 0.1–1.5 mm). The power rating for the tools ranged between 100–1,000 W (preferably 500–600 W).

What is claimed is:

1. A penetrating tool system for providing a penetration action in a workpiece, said system comprising:
   a penetrating element;
   a basic displacement means for establishing a basic displacement between the workpiece and the penetrating element during which basic displacement said penetration action is provided;
   an auxiliary displacement means for imparting to said penetrating element an auxiliary reciprocating displacement superimposed on said basic displacement during said penetration action and having a frequency and amplitude which frequency and amplitude are substantially invariant in time, independent of reactions of the workpiece to penetration, said frequency of the auxiliary reciprocating displacement being substantially greater than a frequency of said basic displacement;
   a balancing means for generating a force in said system substantially counterbalancing inertial loads and reactions in said system set up by said auxiliary reciprocating displacement, said force being directed substantially in line with said auxiliary reciprocating displacement in the direction opposite to the direction of the auxiliary reciprocating displacement.

2. A penetrating tool system according to claim 1, wherein the tool system is stationary and said amplitude of the auxiliary reciprocating displacement does not exceed 0.5 mm.

3. A penetrating tool system according to claim 1, wherein said amplitude of the auxiliary reciprocating displacement is substantially less than said basic displacement.

4. A penetrating tool system according to claim 1, wherein said auxiliary reciprocating displacement is linear.

5. A penetrating tool system according to claim 1, wherein said auxiliary reciprocating displacement is angular.

6. A penetrating tool system according to claim 1, wherein said auxiliary reciprocating displacement is a combination of linear and angular displacements.

7. A penetrating tool system according to claim 1, wherein said basic displacement is linear.

8. A penetrating tool system according to claim 1, wherein said basic displacement is rotary.

9. A penetrating tool system according to claim 1, wherein said basic displacement is arcuate.

10. A penetrating tool system according to claim 1, wherein the frequency of said basic displacement equals 0.

11. A penetrating tool system according to claim 1, wherein said basic displacement is a reciprocating displacement with a frequency higher than 0.

12. A penetrating tool system according to claim 1, wherein the tool system is a hand-held system and said basic displacement is a result of the force exerted by the user.

13. A penetrating tool system according to claim 1, wherein said basic displacement means comprises a basic displacement drive.

14. A penetrating tool system according to claim 1, wherein said auxiliary displacement means comprises an auxiliary displacement drive from which a motion is transmitted to an auxiliary displacement transmission device and converted thereby into said auxiliary reciprocating displacement of the penetrating element, said auxiliary displacement transmission device consisting of mechanically connected rigid elements interacting with each other in a rigid manner.

15. A penetrating tool system according to claim 14, wherein the tool system comprises a single drive from which the motion is transmitted to a basic displacement transmission device and to said auxiliary displacement transmission device and converted thereby into, respectively, said basic displacement and said auxiliary reciprocating displacement of the penetrating element.

16. A penetrating tool system according to claim 14, wherein said balancing means comprises a counterweight which is connected with said auxiliary displacement transmission device so that said auxiliary displacement transmission device imparts to said counterweight a reciprocating displacement which has 180°-phase displacement with respect to said auxiliary reciprocating displacement of the penetrating element.

17. A method for providing a penetration of a workpiece by a penetrating element, the method comprising a step of providing between workpiece and the system a basic displacement whereby a penetration action takes place, a step of imparting to said penetrating element auxiliary reciprocating displacement superimposed on said basic displacement during said penetration action, said auxiliary reciprocating displacement having a frequency and an amplitude which are substantially invariant in time, independent of reactions of the workpiece to penetration, said frequency of the auxiliary reciprocating displacement being substantially greater than a frequency of said basic displacement, and a step of generating a force in said system counterbalancing inertial loads and reactions in said system set up by said auxiliary reciprocating displacement, said force generated in the system being directed substantially in the direction opposite to the direction of the reciprocating displacement.

* * * * *